(12) United States Patent
Varnell

(10) Patent No.: US 7,270,727 B2
(45) Date of Patent: Sep. 18, 2007

(54) PAPER SIZED WITH A SIZING AGENT AND A SELECTED SIZING PROMOTER

(75) Inventor: Daniel F. Varnell, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 401 days.

(21) Appl. No.: 10/424,502

(22) Filed: Apr. 28, 2003

(65) Prior Publication Data

US 2004/0016528 A1    Jan. 29, 2004

Related U.S. Application Data

(62) Division of application No. 09/947,300, filed on Sep. 6, 2001, now abandoned.

(51) Int. Cl.
*D21H 11/00* (2006.01)

(52) U.S. Cl. .................. 162/164.6; 162/158; 162/162; 162/164.1; 162/179; 162/180; 162/183; 162/184; 526/310; 526/312

(58) Field of Classification Search ............ 162/164.6, 162/158, 162, 164.1, 179, 180, 183, 135; 526/310, 312
See application file for complete search history.

(56) References Cited

U.S. PATENT DOCUMENTS

| | | | |
|---|---|---|---|
| 3,912,693 A | 10/1975 | Shimizu et al. | 260/78.5 |
| 4,772,462 A | 9/1988 | Boothe et al. | 424/70 |
| 5,013,456 A | 5/1991 | St. John et al. | 210/734 |
| 5,498,648 A | 3/1996 | De Clercq et al. | 524/47 |
| 5,853,542 A | 12/1998 | Bottorff | 162/168.2 |

FOREIGN PATENT DOCUMENTS

| | | | |
|---|---|---|---|
| JP | 6-116341 A | | 4/1994 |
| JP | 8-49193 | * | 2/1996 |
| JP | 9-241977 A | | 9/1998 |

* cited by examiner

*Primary Examiner*—Mark Halpern
(74) *Attorney, Agent, or Firm*—Joanne Rossi; Gary A. Samuels

(57) ABSTRACT

Sized paper containing an amphoteric promoter resin that is a polymerization reaction product of a quaternary diallylammonium monomer, optionally a diallylammonium monomer, and an unsaturated organic acid is described. The method of sizing paper with such amphoteric promoter resin compound and a sizing agent provides sized paper with significantly improved sizing property characteristics, and the sized paper exhibits superior retention of brightness due to added optical brighteners.

3 Claims, 12 Drawing Sheets

PAPER SIZED WITH A SIZING AGENT AND A SELECTED SIZING PROMOTER

CROSS REFERENCE TO RELATED APPLICATION

Figure 1:
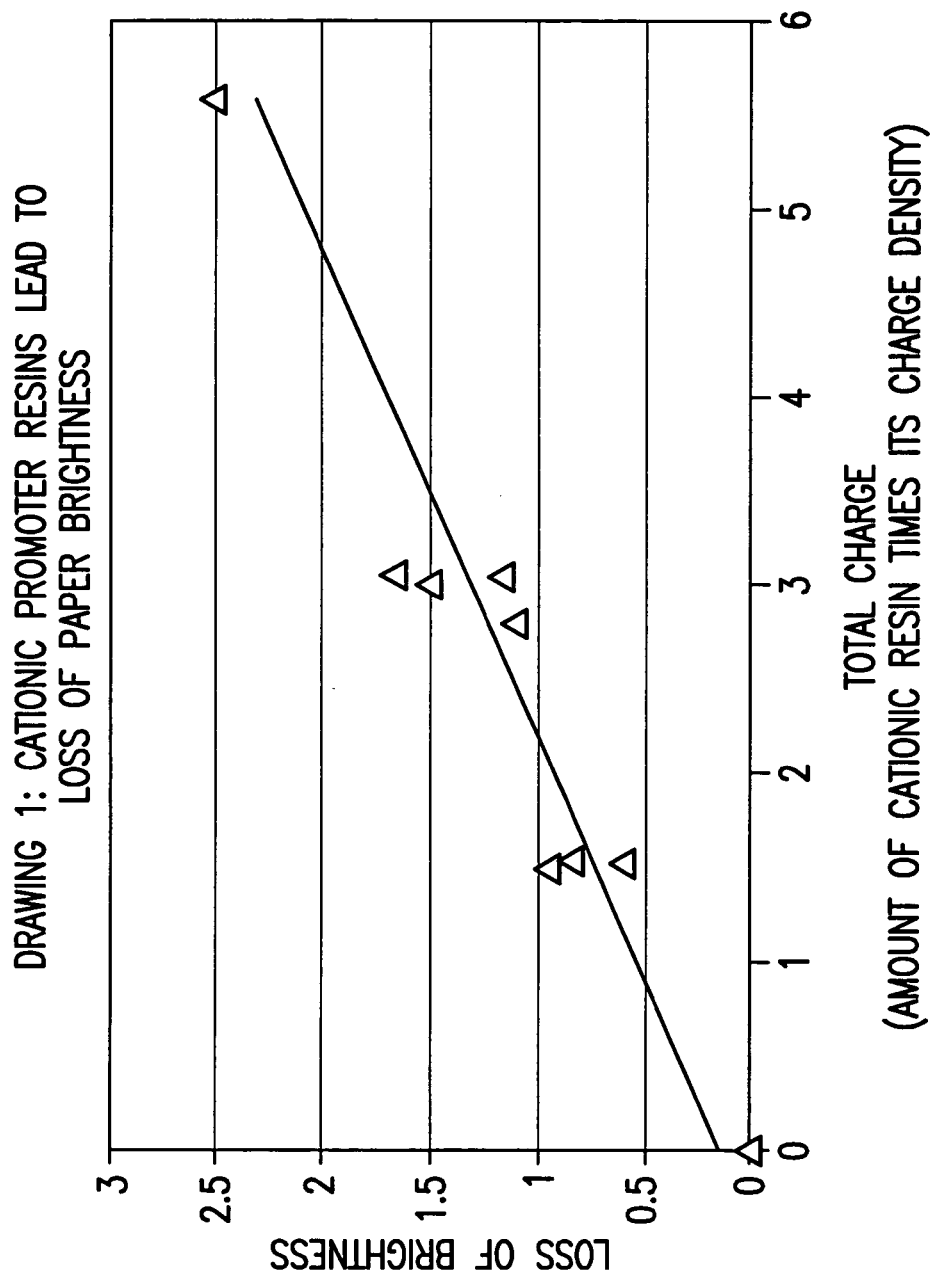
Figure 2:
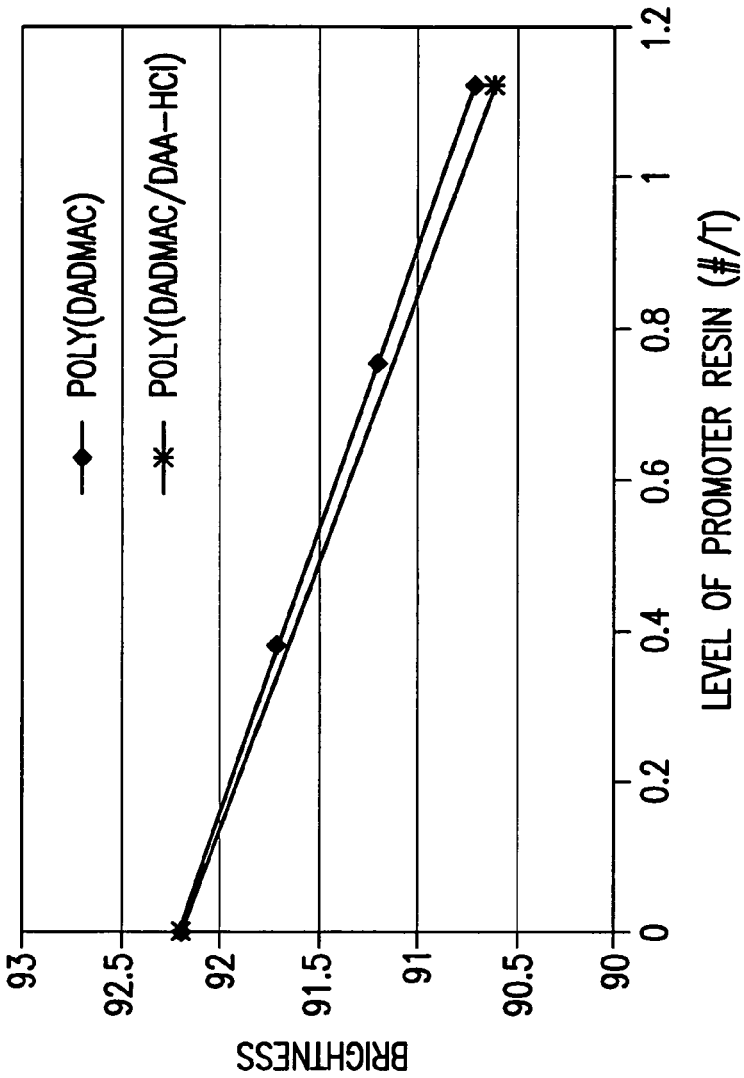
Figure 3:
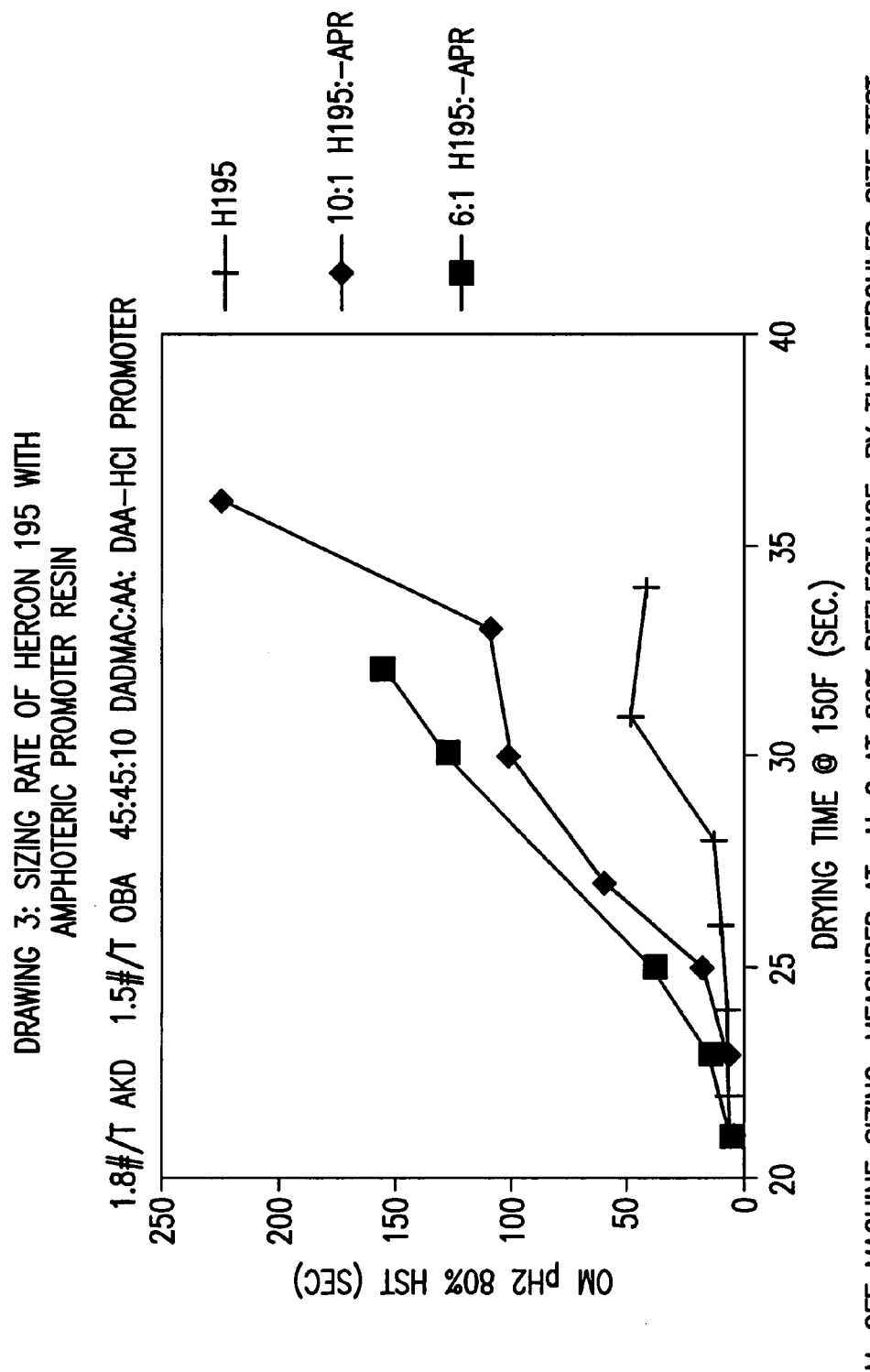
Figure 4:
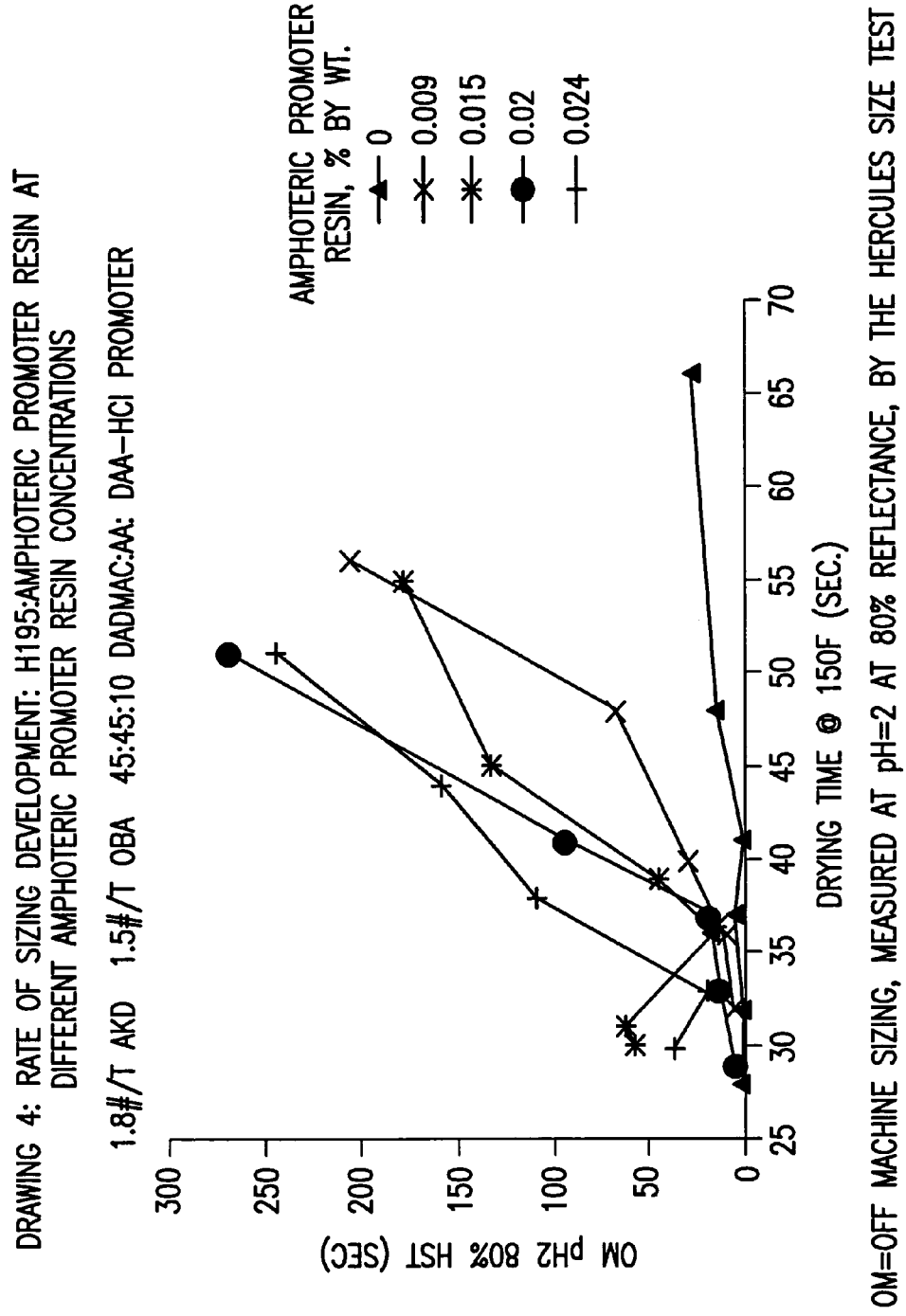
Figure 5:
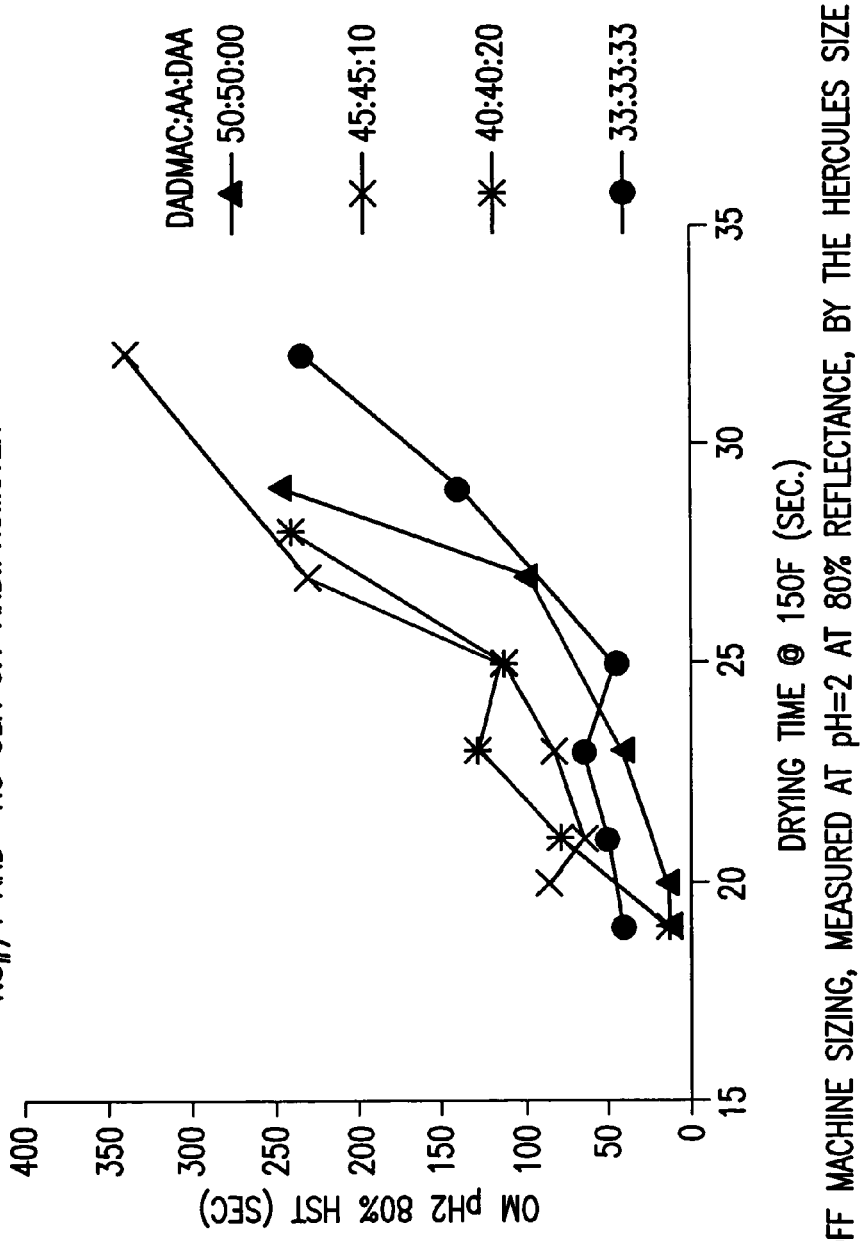
Figure 6:
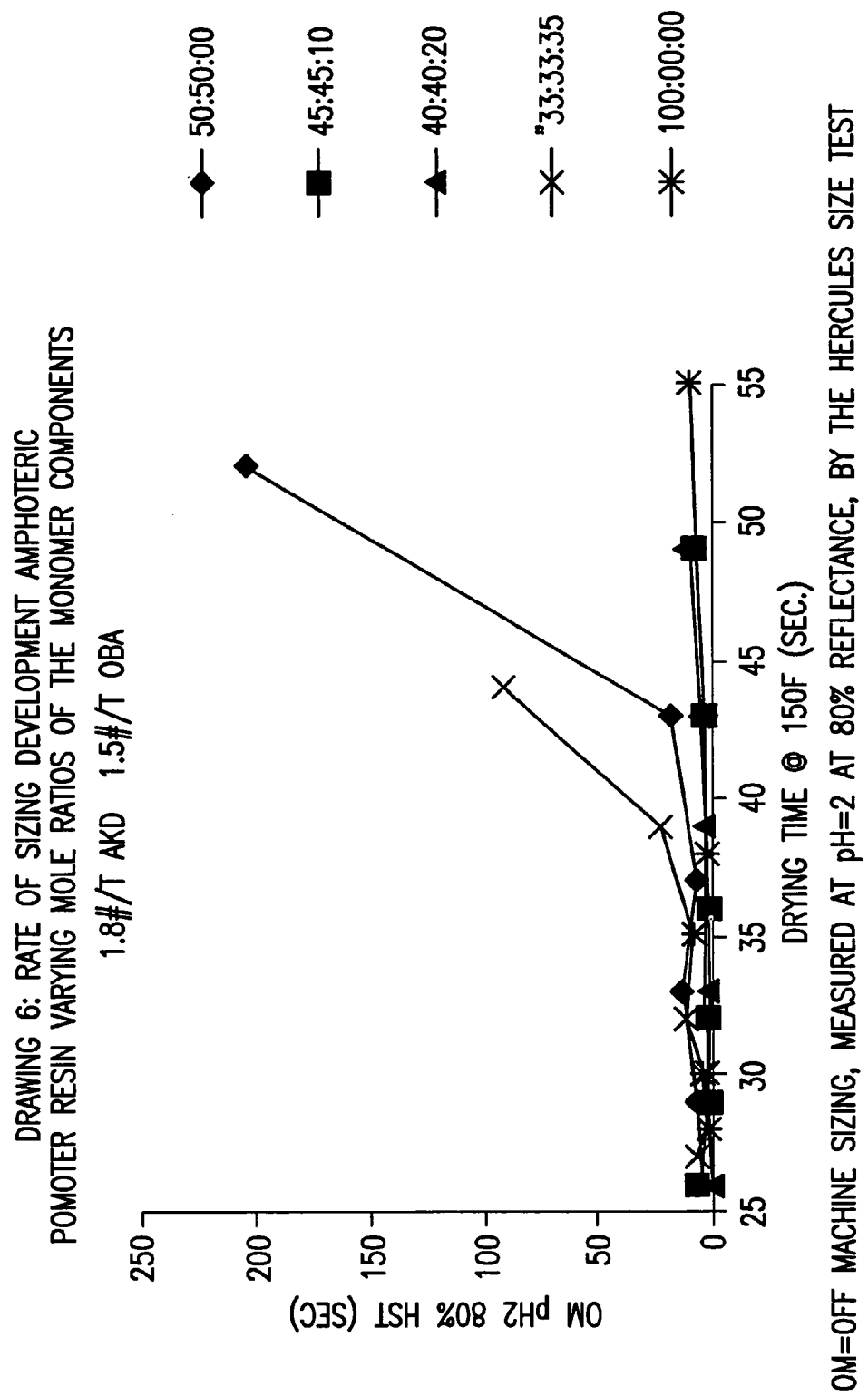
Figure 7:
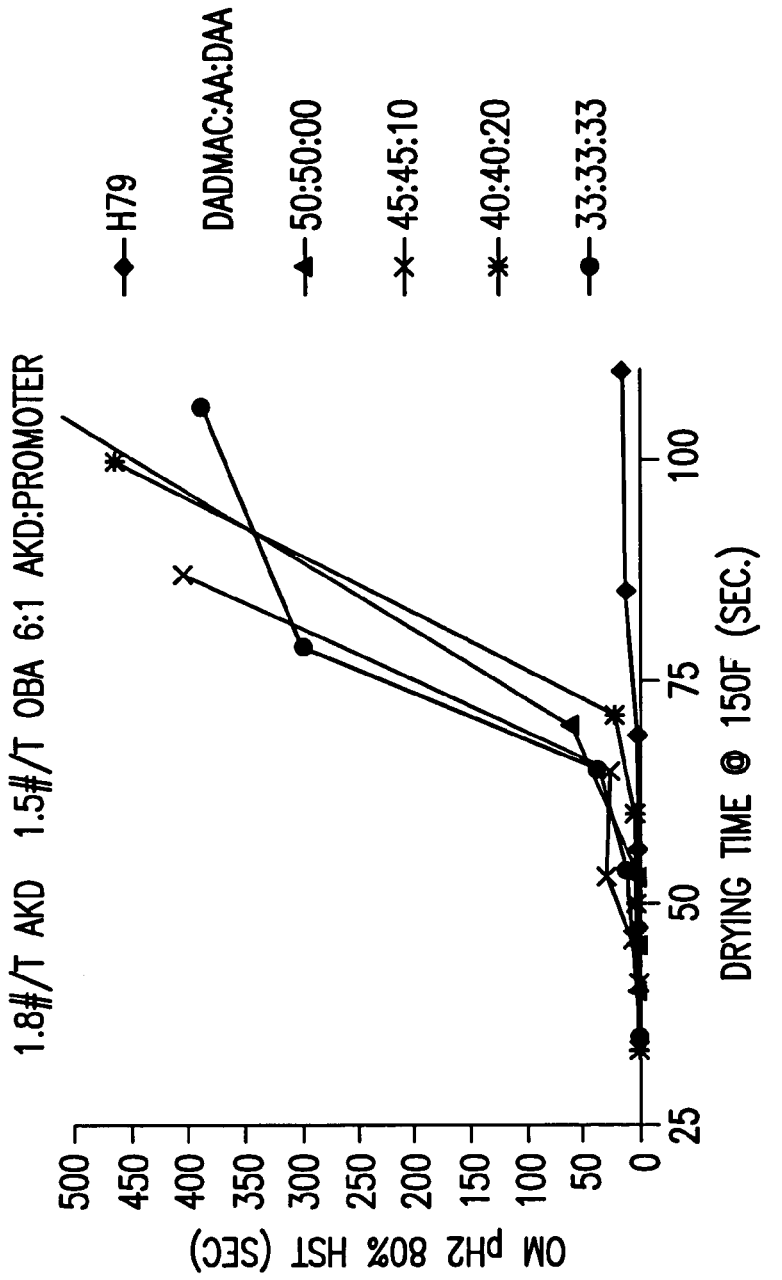
Figure 8:
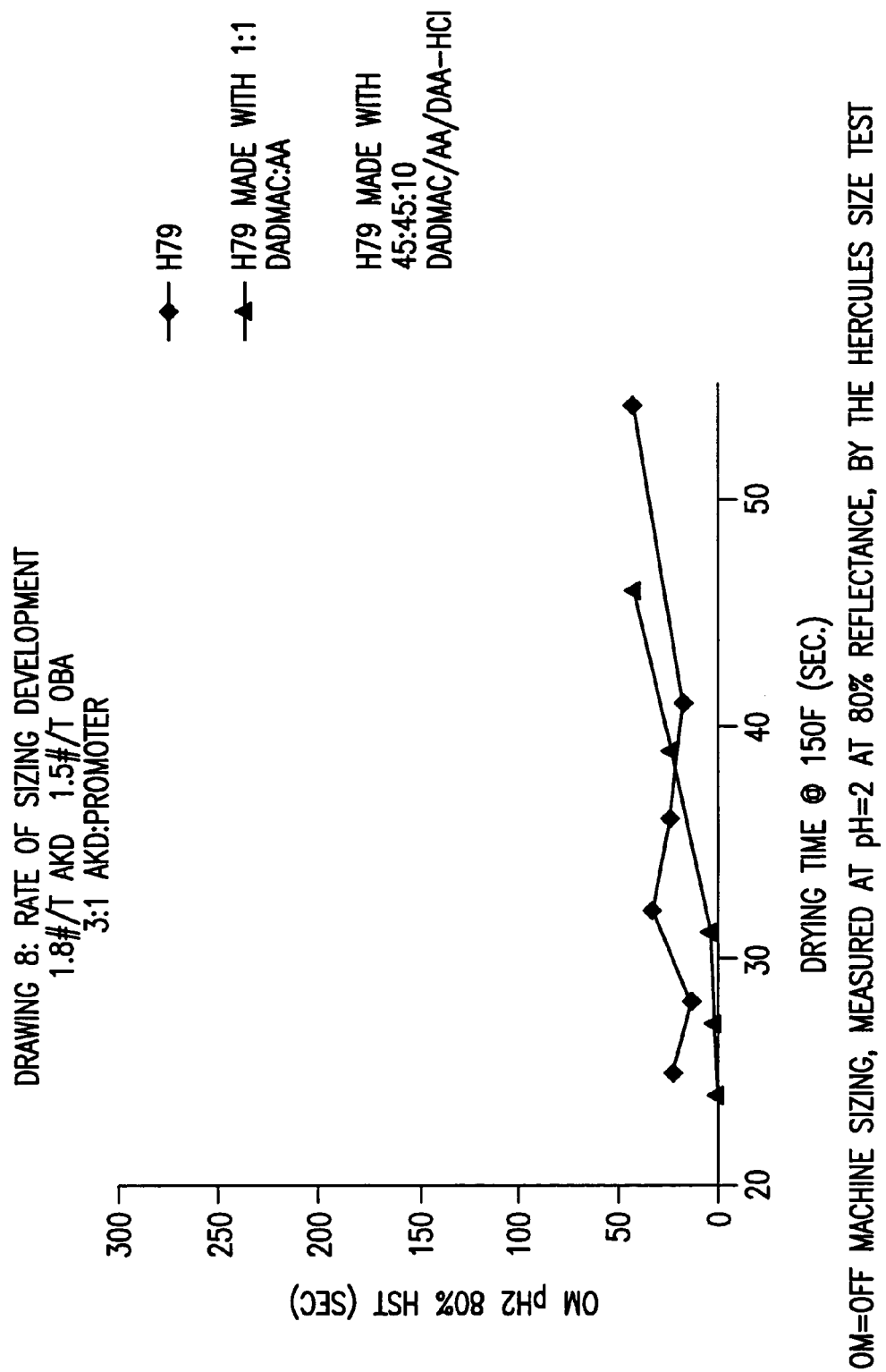
Figure 9:
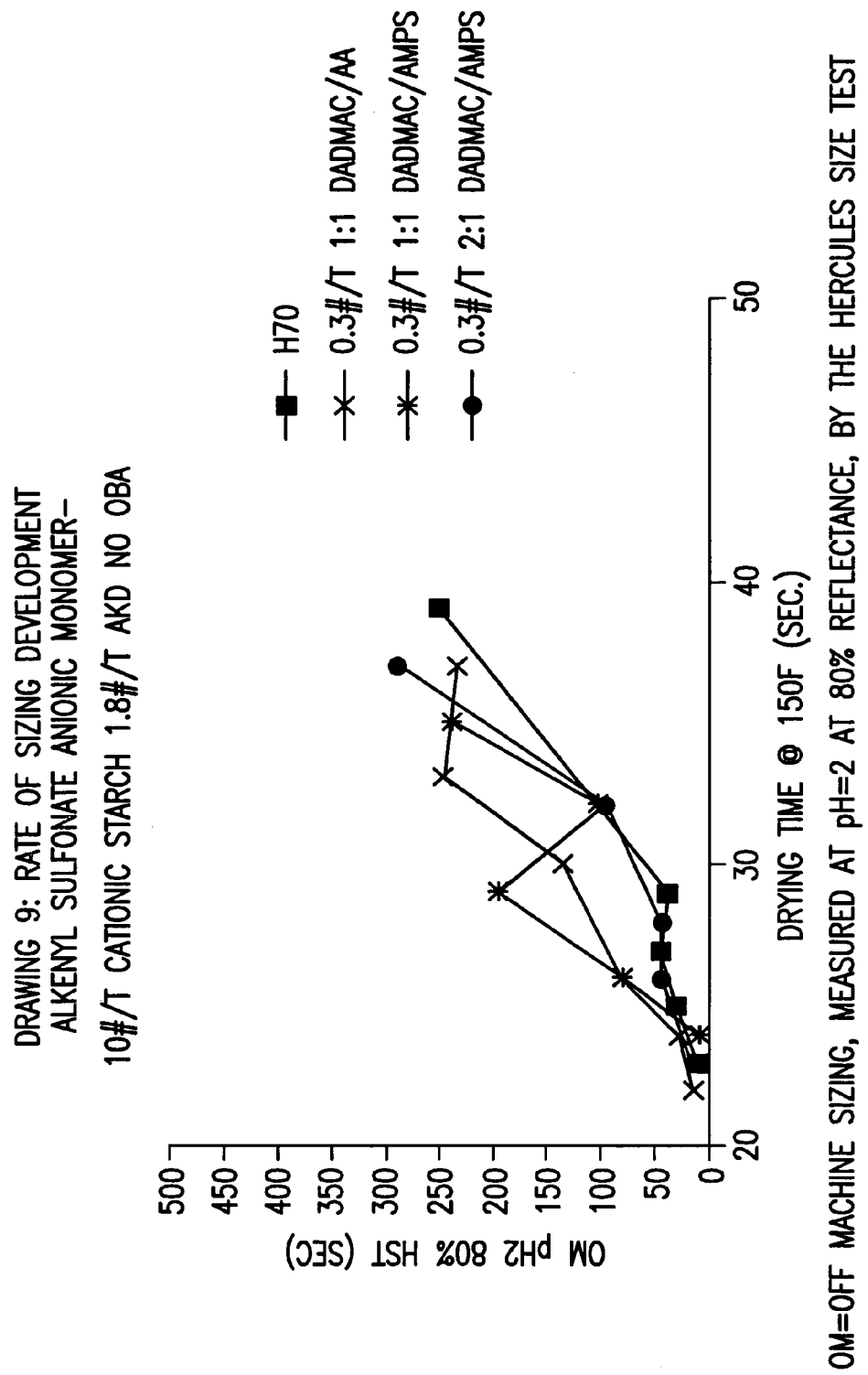
Figure 10:
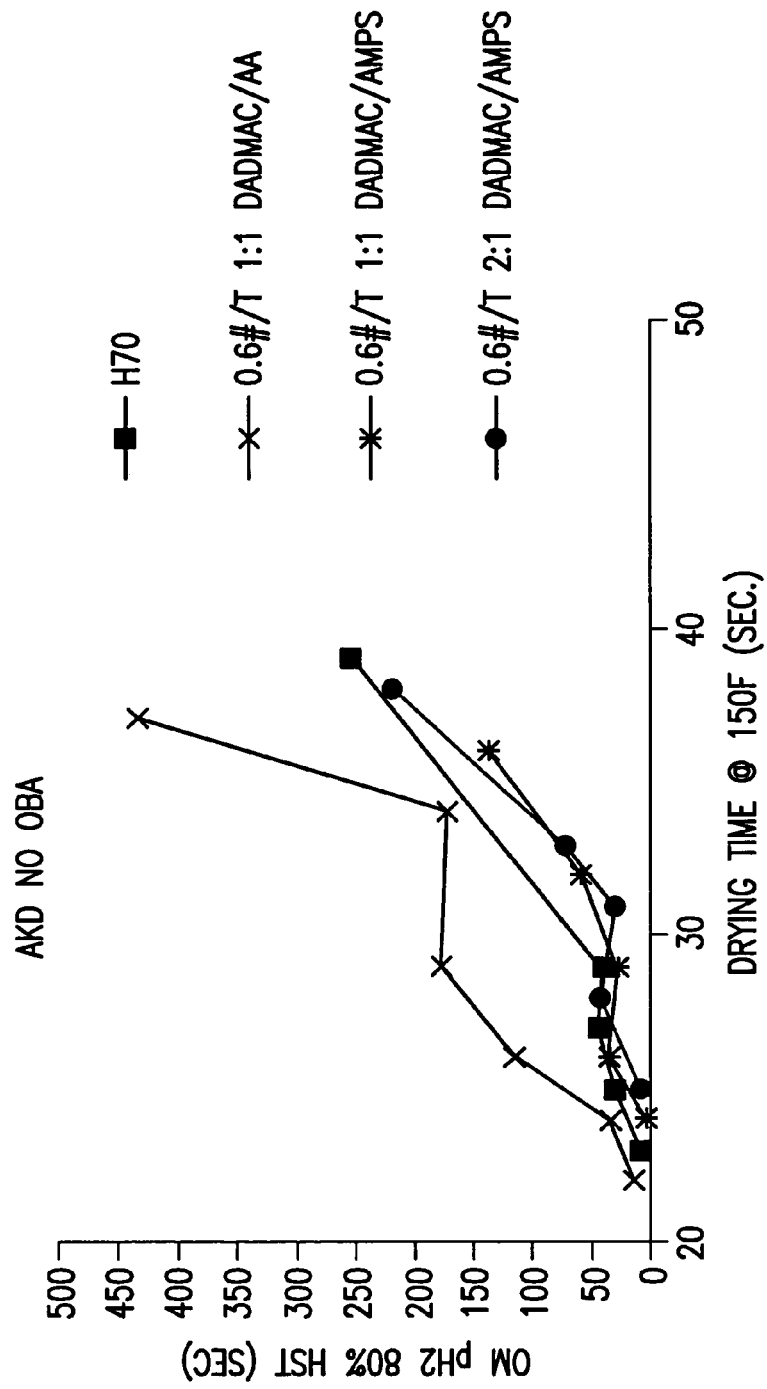
Figure 11:
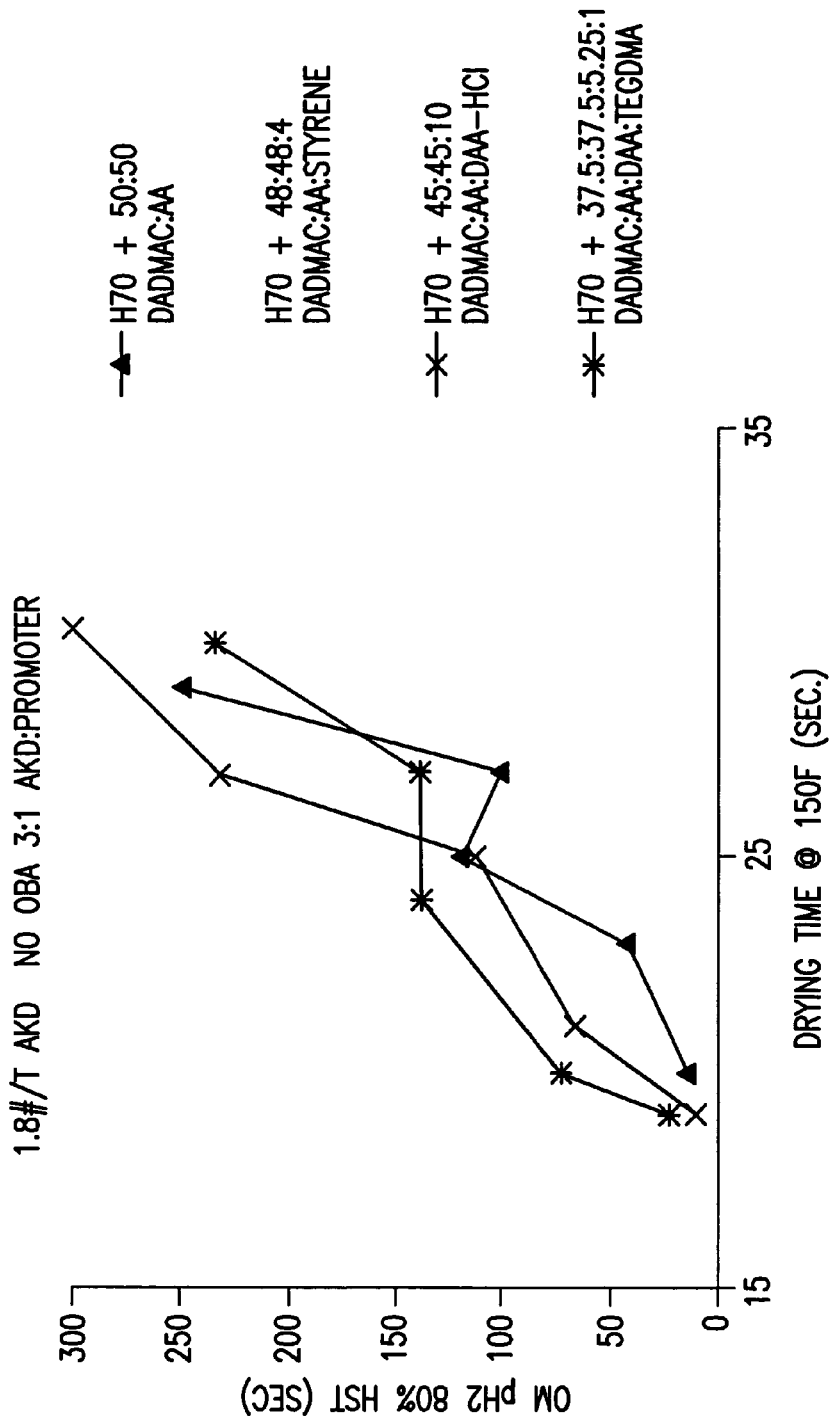
Figure 12:
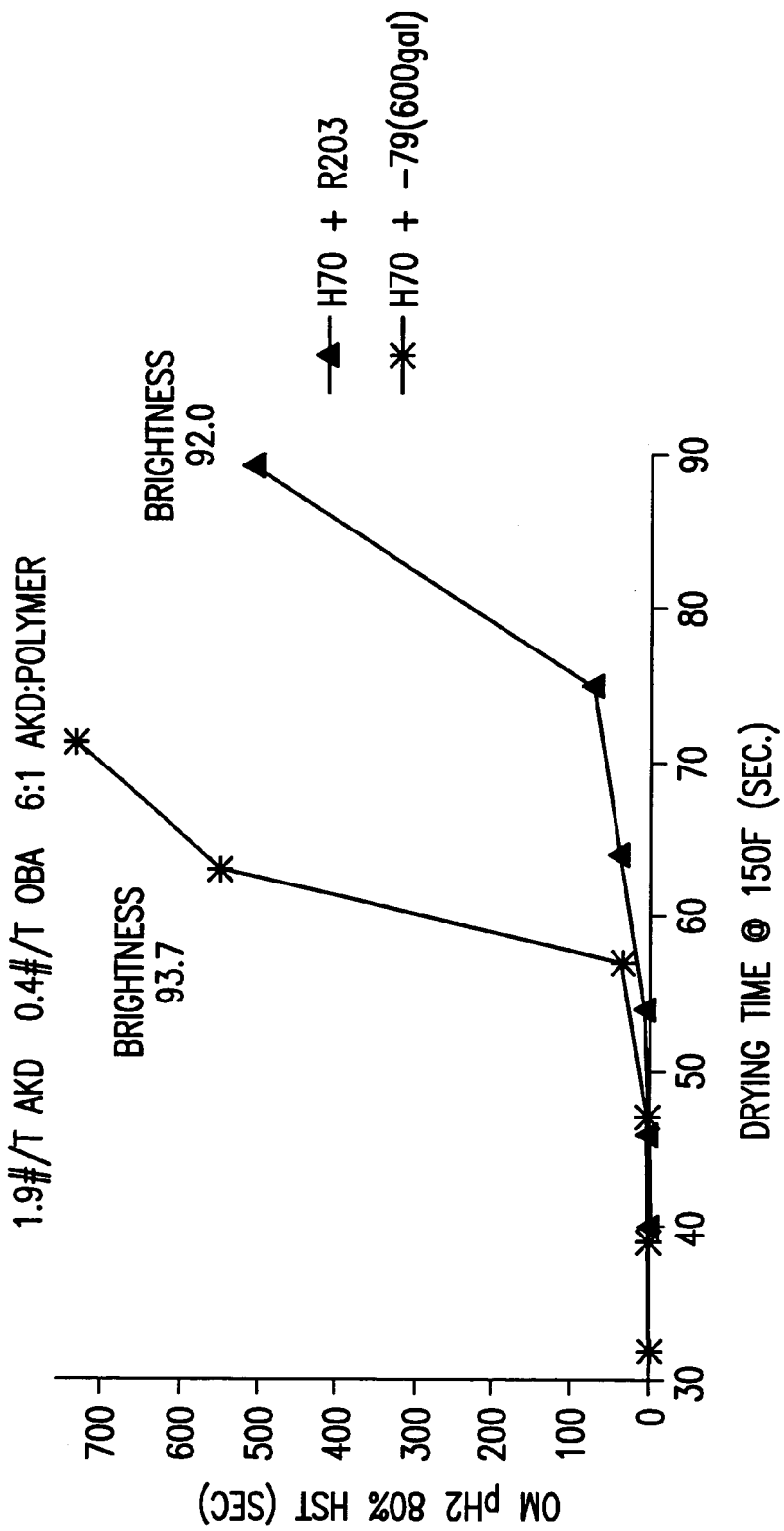

This application is a Divisional of application Ser. No. 09/947,300, filed Sep. 6, 2001 now abandoned.

FIELD OF THE INVENTION

This invention relates to paper sized with a sizing agent and a sizing promoter, and to processes for making the paper.

BACKGROUND OF THE INVENTION

In papermaking and paper finishing, a sizing agent is often employed to provide desirable characteristics sought in the ultimate paper product.

Sizing, or sizing property, is a measure of the resistance of a manufactured paper or paperboard product to the penetration or wetting by an aqueous liquid. Sizing agents are internal additives employed during papermaking or external additives employed as coating agents during paper finishing that increase this resistance.

Papermaking can be carried out under acidic, neutral, or alkaline pH conditions, and the selection of a sizing agent is usually dependent on the pH used. For example, rosin-derived sizing agents are typically used under acidic papermaking conditions. Under alkaline pH conditions, which are widely used in fine paper manufacturing applications, typical sizing agents include alkyl ketene or alkenyl dimers or acid anhydrides such as alkenyl succinic anhydrides.

The rate at which the sizing property develops in the sized paper is very important. The sizing property is advantageously developed as quickly as possible after the sizing agent has been added or applied. It is known that the level of size development increases as sized paper is dried to remove moisture. A fast rate of size development is desired for reducing or controlling the water and additive pick-up at the size press of a paper machine. A fast rate of sizing is also important for accurately measuring final paper properties at the end of the paper machine without waiting or additional heating. In papermaking processes where the sizing agent if added at the wet end of the paper machine, the sized paper is typically dried to about 0.8-3 wt. % moisture to obtain adequate development of the sizing property before the paper reaches the size press; at the end of the size press treatment, the paper is typically dried to about 4-6 wt % moisture.

If the sizing property is not fully developed at the end of the paper machine, corrective measures must be taken, e.g., the paper must be stored for sufficient time (hours or days) until the sizing property develops adequately for the intended use of the paper, or an excess of sizing agent must be used to provide adequate sizing property if the benefit is required (e.g., during the paper finishing or converting steps) before the sizing property has completely developed.

The sizing properties provided by conventional paper sizing agents may be improved by the use of sizing promoters, also called sizing accelerators. Numerous paper sizing promoters are know; see, e.g., U.S. Pat. No. 4,040,984; U.S. Pat. No. 4,764,365; U.S. Pat. No. 4,772,462; U.S. Pat. No. 4,478,682; U.S. Pat. No. 4,847,315; U.S. Pat. No. 4,895,621; U.S. Pat. No. 5,498,648 and U.S. Pat. No. 5,853,542.

Despite the beneficial sizing properties provided by these prior art paper sizing promoters, there is still great demand for further improvement. Promoter resins described in the above patents are detrimental to the effectiveness of optical brighteners that are added to the paper making process to improve the whiteness or brightness of the paper. Therefore, a disadvantage in using conventional sizing promoters is that sizing promoters reduce the effectiveness of optical brighteners which are used to brighten white paper. That is, paper manufactured with sizing agents and sizing promoters will not appear as bright compared to unsized paper each with optical brighteners added. Thus, some of the manufacturing advantage of size promoters is offset by less-bright paper.

Alternately, the interaction of the optical brighteners may inhibit the performance of the sizing promoter. Thus, in order to achieve both paper brightness and promotion of sizing more of these agents must be added to the paper machine.

Cationic polymers and copolymers based on the cyclopolymerization of dimethyldiallylammounium chloride are well know for use in a wide variety of industrial applications. Poly(diallyldimethylammounium chloride) homopolymers are well known cationic polymeric compounds that have been used commercially in papermaking for a wide variety of purposes, e.g., for aiding furnish retention and additive retention in paper; for increasing the dewatering rate of wet paper web; for neutralizing anionic materials in white after; and for size enhancement, to improve paper sizing efficiency and its rate of development. Reten® 203 retention aid (Hercules Incorporated, Wilmington, Del.), a product which contains a diallyldimethylammonium chloride homopolymer, is one such product.

Copolymers and terpolymers containing diallylamine-type compounds, such as diallyldimethylammonium chloride (DADMAC), methylalkiallyl ammonium chloride or diallylammonium chloride (also referred to as DAA.HCl or DAAC), as one of the monomeric components are known. Japanese Patent 57 161197, discloses use of copolymers of sulfur dioxide and diallyldialkylammonium salts, such as DADMAC, or diallylammonium salts, as a dispersing agent with a paper sizing agent. European Patent 282 081, discloses (meth)acrylamide terpolymers that also contain DADMAC or diallylamine, useful in combination with aluminum sulfate for increasing paper strength. Japanese Patent 52 47883, discloses copolymers of acrylamide and diallylamine-type compounds, useful for producing stronger paper. U.S. Pat. Nos. 4,279,794 and 4,295,931, disclose the use of poly(diallylamine) epihalohydrin resins as paper sizing accelerators. Japanese Patent 62 99494 discloses use of copolymers of diallylammonium salts and certain nonionic water-soluble monomers (e.g. acrylamide) with a paper sizing agent to provide improved sizing property development.

Another approach to improving sizing is reported in U.S. Pat. No. 5,853,542, here the copolymer of DADMAC and DAA.HCl are reported to enhance paper sizing. Since the resultant copolymers are cationic they would be expected to inhibit the effectiveness of optical brighteners. The adverse interaction of cationic paper additives is well documented by William F. Scott in Principles of Wet End Chemistry, TAPPI Press, 1996, page 48.

Other reports in the literature describe polymers of DADMAC and DAA.HCL and optional less than 20% alpha beta carboxylic acids. Japanese Patent Application No. Hei (9) 1997-3793 describes a polymer of diallylamine, methacrylamide and a critical cross-linking monomer and optionally less than 20% of an anionic unsaturated carboxylic acid-based compound polymer system which increases paper strength, improves freeness (measure of pulp drainability), without disturbing the formation of the paper. Their most essential monomers are acrylamide and substituted acrylamides which are not cationic relative to their acrylamide functionality.

Japanese Patent No. Hei (8) 1996-49193 describes polymers derived from hydrophilic vinyl monomers with amino groups and/or quaternary ammonium groups and hydrophobic vinyl monomers. The hydrophilic vinyl monomers would function as cations if they are quanterized. Polymers with up to 5% acrylic acid are shown in this report. The resultant polymers are used to coat papers to provide superior printability.

White paper is achieved by adding optical brighteners in the form of fluorescent dyes. These dyes are very effective when used with highly bleached pulps. These fluorescent dyes absorb light in the ultraviolet region (below 370 nm) and re-emit the light in true visible range (usually the blue region). This gives a fluorescent effect that produces a bright white in daylight masking the inherent yellowness of the bleached pulp. (Principles of Wet End Chemistry, William F. Scott, TAPPI Press, 1996, page 47).

In Principles of End Chemistry, William F. Scott Tappi Press, 1996, page 48, Reynolds describes that it is critical not to add anionic cyes close to the addition point of a cationic additive.

The fluorescent dyes are generally anionic and under use conditions their effectiveness is significantly inhibited by the cationic sizing promoters. Optical brightener producers such as the Clariant Corporation, Charlotte, N.C. or The Bayer Corporation, Pittsburgh, Pa. advise that the optical brighteners should be added at points in the paper making process significantly removed from cationic chemicals such as the common sizing promoter resins.

An attempt at mitigating the adverse effect of sizing promoters on the optical brighteners is described in U.S. Pat. No. 5,498,648. This is achieved by paper size mixtures which are prepared by mixing an aqueous suspension of a digested cationic starch with a finely divided aqueous polymer dispersion and emulsifying a $C_{14}$-$C_{20}$ alkyldiketene is this mixture at not less than 70° C. The patent describes that the digested cationic starch and dispersion combine to reduce the negative impact on the paper whiteness.

Despite the reported usefulness of diallyl-based cationic polymers for a variety of industrial purposes, there has not been found any suggestion in the prior art of the usefulness of co- and terpolymers of diallyldialkylammonium salts, optionally, diallylamonium salts, and unsaturated organic acids for improving the sizing property characteristics of sized paper, while not adversely effectiveness paper brightness from optical brightners.

SUMMARY OF THE INVENTION

The current invention employs a sizing promoter that is a polymerization reaction product of one or more selected cationic unsaturated monomers capable of free radical polymerization and one or more selected anionic unsaturated monomers also capable of free radical polymerization. The sized paper containing the reaction product is one aspect of the invention.

It was unknown prior to the current invention that compositions which employ polymers which have significant fractions of certain cationic components could be employed as successfully as they are in the present invention. Specifically, it was expected that the use of a polymer with cationic components greater than 50% would interfere with the use of certain other additives, such as optical brightening agents, which, depending on the particular market, can be of economic importance. In the present invention, these polymers which have anionic and cationic components are found to be effective promoter resins even when used in relatively low amounts. These polymers are called amphoteric promoter resins to denote the cationic and anionic properties of their components. And, surprisingly, the amphoteric promoter resins do not interfere with such additives when the amphoteric promoter resins are employed in low amounts and have considerably less interference even at high levels versus nonamphoteric cationic resins. Additives especial notable are the optical brighteners which are added to whiten and brighten paper.

In the broadest sense the amphoteric promoter resins are polymers which include: a) at least one type of quarternary amine based segments that improve the rate of sizing development and b) at least one type of anionic segments that will offset the effect the cationic portion of the polymer has on optical brightening agents (OBA).

A subset of the polymer amphoteric resins are prepared from one or more of a quaternary diallylammonium monomers, optionally diallylammonium monomer and an unsaturated organic acid monomer is a novel compound when the molar percentage of the unsaturated organic acid is at least 25% on a molar basis and the molar sum of the quaternary diallyl ammonium monomer and the diallyl ammonium monomer is at least 25% on a molar basis.

More specifically, water soluble amphoteric promoter resin compositions consist essentially of I(a) recurring units of a product of a monomer comprising at least one polymerizable cationic amine of formula (I)

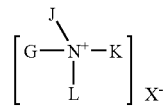

where G is selected from alkenyl, allyl, alkenyl, styrenyl, and J, K, and L are selected from hydrogen, alkyl, alkenyl, allyl, styrenyl or aryl; and (b) at least one polymerizable organic acid of formula (II)

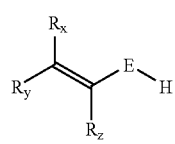

where $R_x$, $R_y$, and $R_z$ are hydrogen, alkyl, alkenyl or aryl and E is an organic substituent selected from the group $COO^-$, $SO_3^-$, $HSO_4^-$ and $H_2PO_{4-}$;

and wherein the mole percent of the organic acid of formula I constitutes at least 25% of monomers in the amphoteric promoter resin and mole percent of the organic acid of formula 11 constitutes at least 25% of monomers in the amphoteric promoter resin.

A more preferred aspect of the present invention is a sized paper that contains a promoter that consists essentially of (a) recurring units of at least one quaternary diallylammonium monomer of formula (III):

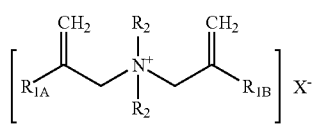

optionally including a diallylammonium monomer of formula (IV):

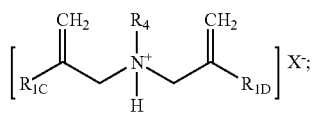

where $R_{1A}$, $R_{1B}$, $R_{1C}$, and $R_{1D}$ are hydrogen or $C_1$-$C_8$ straight chain or branched alkyl; $R_2$ and $R_3$ are alkyl, alkenyl aryl, heteroatom interrupted alkyl or alkenyl, wherein the heteroatoms are selected from the group N, S, and O; $R_4$ is hydrogen, alkyl, alkenyl, aryl, heteroatom interrupted alkyl or alkenyl, wherein the heteroatoms are selected from the group N, S and O; and X— is a monovalent anion or a multivalent equivalent of a monovalent anion; and (b) an organic acid of formula (II)

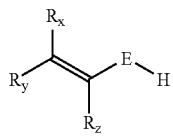

where $R_x$, $R_y$, and $R_z$ are hydrogen, alkyl, alkenyl or aryl heteroatom interrupted alkyl or alkenyl, wherein the heteroatoms are selected from the group N, S, and O; and E is an organic substituent selected from the group COO, SO3, HSO4, and H2PO4.

In addition, more than one type or species of formula (III) monomer, of formula (IV) monomer and of formula (II) monomer may be employed to produce polymerization product.

Still another aspect of the invention is a method of producing sized paper with enhanced sizing property characteristics by employing the paper sizing promoter.

Among the benefits of the present invention, the sizing promoters increase the rate at which the sizing property develops in paper when the sizing promoters are used with sizing agents. Sized paper made with the sizing promoter of this invention exhibits an accelerated rate of sizing property development, and may require the use of less sizing agent. Other benefits and advantages of the present invention will be apparent herein.

BRIEF DESCRIPTIONS OF THE DRAWINGS

Drawing 1 is a chart depicting how commercial cationic promoter resins inhibit optical brighteners.

Drawing 2 is a chart depicting that two commercially used cationic promoter resins, poly(DADMAC) and Poly(DADMAC/DAA.HCL) reduce the effectiveness of optical brighteners.

Drawing 3 is a chart depicting paper sizing efficiency of the amphoteric promoter resin.

Drawing 4 is a chart depicting paper sizing efficiency of the amphoteric promoter resin showing the effect of different concentration of the amphoteric promoter resin.

Drawing 5 is a chart depicting paper sizing efficiency of the amphoteric promoter resin showing the effect of different ratios of the monomer components of the amphoteric promoter resin.

Drawing 6 is a chart depicting paper sizing efficiency of the amphoteric promoter resin showing the effect of different ratios of the monomer components of the amphoteric promoter resin.

Drawing 7 is a chart depicting paper sizing efficiency of the amphoteric promoter resin showing the effect of different ratios of the monomer components of the amphoteric promoter resin.

Drawing 8 is a chart depicting paper sizing efficiency of the amphoteric promoter resin.

Drawing 9 is a chart depicting paper sizing efficiency of the amphoteric promoter resin showing the effect of alkenyl sulfonate monomer components on the amphoteric promoter resin.

Drawing 10 is a chart depicting paper sizing efficiency of the amphoteric promoter resin showing the effect of alkenyl sulfonate monomer components on the amphoteric promoter resin.

Drawing 11 is a chart depicting paper sizing efficiency of the amphoteric promoter resin showing the effect of other monomer components on the amphoteric promoter resin.

Drawing 12 is a chart depicting paper sizing efficiency of the amphoteric promoter resin with the optical brightness of the final products.

DETAILED DESCRIPTION OF THE INVENTION

The references in this specification of "paper" and "papermaking" are intended to cover not only paper (and its manufacture), but also paperboard, molded paper and other similar cellulosic-web based materials (and their manufacture), that are typically manufactured with papermaking equipment and procedures and that require additives such as sizing agents for modification of the sizing property of the resultant product.

Before further discussion, definition of the following, terms will aid in understanding of the present invention.

PAPER SIZING: Treatment of paper to resist liquid penetration, either by means of wet end additives or surface application.

SIZE: Any material used for internal, or surface sizing, for example, rosin with alum, starch, animal glue, gelatin, latex, alkyl ketene dimer, alkyl succinic anhydride, and the like.

PROMOTER RESINS: Chemicals added to the paper making process which accelerates the activity of a paper size.

BRIGHTNESS: The reflectance by white or near whit papers. It is a primarily a measure of freedom from pulp yellowness associated with the presence of lignin and other impurities left by incomplete bleaching.

OPTICAL BRIGHTNESS FOR PAPER: Fluorescent dyes that absorb light in the ultraviolet region of the spectrum (below 370 nm) and re-emit the light in the visible blue range (peaking at 435 nm, giving a fluorescent effect that produces a bright white in daylight, masking the inherent yellowness of the bleached pulp.

The polymeric amphoteric promoter resins are polymers which include: a) at least one type of cationic based segments that improve the rate of sizing development and b) at least one type of anionic segments that offsets the effect the cationic portion of the polymer has on optical brightening agents. Addition of a third type of segment consisting of a units formed when diallylamine hydrochloride (DAA-HCl) is included in the polymerization mixture. A preferred embodiment is the use of DADMAC as the cationic based segment and acrylic acid as the anionic segment and DM.HCl as the optional third monomer. This DADMAC, DM.HCl and acrylic acid polymerization mixture was found to give a significant boost in performance. Other monomers can also be included in the polymer which can be any repeat units provided they do not absorb UV light such as to quench the effect of the Optical Brightener Agent (OBA) and they do not render the polymer water insoluble and they are not added at a level that brings the polymer composition outside prescribed ranges.

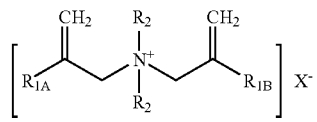

The cationic based segments in the polymer of interest are those that promote sizing. In other words, the cationic based segments of interest are those that will promote sizing without the addition of anionic segments of the current invention. Excluded from the list of useful segments or monomers are those that lead to a polymer with a relatively strong absorption of light in the same ultraviolet spectrum region utilized by an Optical Brightener Agent (OBA) to give brightness. Some examples of useful monomer or segments are DADMAC, methyl-diallyl ammonium chloride, DAA-HCl, disyandiamide amine bis-aminopropylpiperazine and ethyleneimine as well as many derivatives of these materials.

As with the cationic monomer that leads to a polymer with a relatively strong absorption of light in the same ultraviolet spectrum region utilized by an OBA to give brightness is not desirable to the current invention. The anionic monomers may be either based on barboxylic acid or sulfonate functionality or other anionic functionality that will reduce the interaction of the polymer such as reaction of anacrylamide. The partial anionic and partial cationic nature of the final polymer is what is important and not the means of getting there. The anionic monomers with carboxylic acid functionality are preferred.

The paper sizing promoter used in this invention is a polymerization reaction product prepared from at least one quaternary diallylammonium monomer, optionally at least one diallylammonium monomer and at least one alpha, betz unsaturated carboxylic acid. The polymerization reaction product is preferably prepared from the monomers:

(i) quaternary diallylammonium monomer of formula (III),

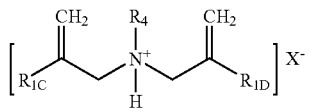

and
(iii) unsaturated organic acid of formula (II)

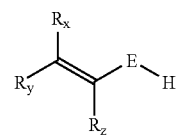

Alternatively, the unsaturated organic acid can be an unsaturated carboxylic acid of formula (V).

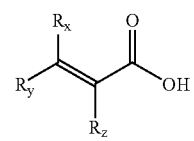

In formulas (III) and (IV), the $R_1$ radicals $R_{1A}$, $R_{1B}$, $R_{1C}$ and $R_{1D}$ are each either hydrogen or methyl. The $R_1$ radicals are preferably hydrogen.

In formula (III), $R_2$ is alkyl, alkenyl or aryl, preferably $C_1$-$C_{22}$ alkyl, $C_1$-$C_{22}$ alkenyl, or aryl. Likewise, in formula (IV), $R_3$ is alkyl, alkenyl or aryl, preferably $C_1$-$C_{22}$ alkyl, $C_1$-$C_{122}$ alkenyl, or aryl.

In formula (IV), $R_4$ is $C_1$-$C_{22}$ alkyl, $C_1$-$C_{22}$ alkenyl, aryl or hydrogen with hydrogen being the preferred structure.

In formulas (III) and (IV), the $R_2$, $R_3$ and $R_4$ structures (other than hydrogen) may be unsubstituted or substituted, e.g., alkyl may be hydroxyalkyl, carboxy, alkoxy, mercapto or thio. Likewise, in formulas (III) and (IV), the $R_2$, $R_3$ and $R_4$ alkyl structures, alkenyl structures and aryl structures may include ester groups and may be interrupted by heteroatoms, e.g., N or S, or by heterogroups, e.g., —NH—CO— or —CO—NH—.

In formulas (III) and (IV), the $R_2$, $R_3$ and $R_4$ alkyl structures and alkenyl structures may be straight chained or branched. The radicals $R_2$, $R_3$ and $R_4$ are preferably uninterrupted alkyl radicals with 1-18 carbon atoms, more preferably 1-4 carbon atoms.

Examples of suitable alkyl structures for $R_2$, $R_3$ and/or $R_4$ are n-docosyl, n-pentadecyl, n-decyl, i-octyl, i-heptyl, n-hexyl, i-pentyl and, preferably, n-butyl, i-butyl, sec-butyl, i-propyl, ethyl and methyl. The radicals $R_2$, $R_3$ and $R_4$ are preferably identical and are preferably methyl.

Preferred alkenyl groups for the $R_2$, $R_3$ and $R_4$ structures in formulas (III) and (IV) include octadecenyl, hexadecenyl, undecenyl, octadec-dienyl, hexadec-dienyl, or mixtures of these. Preferred aryl groups for $R_2$, $R_3$ and $R_4$ radicals in formulas (III) and (IV) include benzyl and phenyl.

In monomers of formula (III), the $R_2$ and $R_3$ structures are preferably selected from, in decreasing order of preference: methyl, benzyl, $C_2$-$C_{22}$ alkyl, phenyl, octadec-dienyl or hexadec-dienyl, octadecenyl or hexadecenyl or undecenyl, and other alkyl and aryl.

In monomers of formula (IV), the $R_4$ structures is preferably: hydrogen,.

In monomers of formula (II) and (V) $R_x$, $R_y$, and $R_z$ are hydrogen, alkyl alkenyl, aryl, alkenylaryl and heteroatom interrupted alkyl, aryl or alkenyl, wherein the heteroatoms are selected from the group N, S, and O.

In formulas (III) and (IV), $X^-$ is a sizing compatible anion. Salts of inorganic acids and common organic acids may be used. Preferably, $X^-$ is selected from halide, nitrate, acetate, benzoate, sulfate or phosphate. Preferred halides are chloride, fluoride and bromide. More preferably, $X^-$ is chloride or fluoride. Most preferably $X^-$ is chloride.

More preferred monomers of formulas (III) and (IV) are those in which $R_{1A}$, $R_{1B}$, $R_{1C}$ and $R_{1D}$ are and $R_4$ are hydrogen and $R_2$ and $R_3$ are methyl. For such preferred monomers where $X^-$ is chloride, the monomer of formula (III) is diallyldimethylammonium chloride, sometimes referred to herein as DADMAC, and the monomer of formula (IV) is diallylammonium chloride, sometimes referred to herein as DM.HCl.

$R_1$, $R_2$, $R_3$ and $R_4$ are limited in that the final polymer must be water soluble. The nature of this limitation is that it depends on the chemistry of $R_1$, $R_2$, $R_3$ and $R_4$ and the level to which it is present.

More preferred alpha, beta unsaturated carboxylic acids of formula (V) are cinnamic acid, crotonic acid, sorbic acid, acrylic acid, methacrylic acid, itaconic acid, propiolic acid, maleic acid, and fumaric acid. Acrylic and methacrylic acids are preferred.

In addition compounds such as maleic anhydride, succinic anhydride may be used. During the polymerization these are likely to remain as anhydrides, but under paper machine use conditions would be hydrolyzed to produce the requisite acidic form.

The polymeric reaction products of the polymerization of monomer of formula (III), monomer of formula (IV) and formula (II) preferably contain only these monomeric components in the polymer; and not significant amounts of other monomeric components in addition to the formula (III) monomer, formula (IV) monomer and formula (II) monomer.

The portion of the polymer that is derived from monomer formula III and formula IV are in their cationic state for all conditions anticipated for use in this invention. Thus, the monomers of formulas III and IV are described as quarternary cationic amines. The groups that make up the 4 groups substituted on the nitrogen can be hydrogen, alkyl, akenyl, aryl, allyl, and the like. This in this definition both $(CH_3)_4N^+Cl$ and $(CH_3)_3N^+HCl$ are considered quarternary cationic amine.

The portion of the polymer that is derived from the monomer formula V is anionic under the conditions that is experienced during the alkaline paper making process. Thus, the combination of the cationic components [formula (III) and formula (IV)] and the anionic component [formula (II)] produce a polymerization product, which is amphoteric under papermaking conditions.

Under the condition used to prepare the polymers described by this invention, the unsaturated carboxylic acid [formula V].

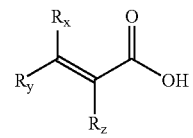

is in its acidified form and thus unchanged during the polymer synthesis.

The ratio of monomers or segments with cationic amine anionic functionality in the polymer effects how well the polymer promotes sizing and how little effect it will have on OBA efficacy. The final polymer must consist of, on a molar basis, at least 25% total amine based cationic monomer units including the amount of DAA.HCl, if it is present. More preferred is a level of at least 30%. Most preferred is a level of at least 40%. The amount of specific cationic groups and anionic groups is best expressed as a percentage, on a molar basis, of the total cationic monomer units. Of the cationic segments it is preferred that up to 65% and most preferably 10 to 50% on percentage of the cationic segments are DAA.HCl. There should be at least 33% as many anionic groups as there are cationic groups. The more preferred range is 50% or higher. The most preferred range is 65% or higher. For example, a polymer in the preferred range would be one that consists on a molar basis of 40%, DADMAC; 20%, DAA-HCl; and 40% acrylic acid. For this polymer the anionic molar % based on the cationic components would be 67%.

It was unknown prior to the current invention that compositions that employ polymers which have significant fractions of cationic components can be employed as successfully as they are in the present invention. Specifically, it was expected that the use of a polymer with cationic components greater than 50% would interfere with the use of certain other additives, such as optical brightening agents, which, depending on the particular market, can be of economic importance. In the present invention, amphoteric promoter resins are found to be effective promoter resins even when used in relatively low amounts and, surprisingly, the amphoteric promoter resins do not interfere with such additives when the amphoteric promoter resins are employed in low amounts and have considerably less interference even at high levels versus nonamphoteric cationic resins.

While the use of sizing and the amphoteric promoter resins can be applied to many types of paper preferred papers are those papers used in printing where contrast of the paper and the printing is important. Other preferred papers are also those where high brightness levels are the goal. Most preferred papers are those generally classified as "fine papers" used such uncoated papers made for electroreprographic or ink-jet printing. A very common application where the usefulness of the current invention would be especially obvious is in high brightness cut-sheet copy paper.

A key to this invention is the understanding of how optical brighteners are used to make paper appear brighter, or more white. Optical brightening agents ("OBA's") are discussed for example, in Encyclopedia of Chemical Technology, Kirk & Othmer, eds, 3rd. edition (1978), John Wiley and Sons, New York, As noted therein, with the aid of optical brighteners, also referred to as fluorescent whitening agents (FWA) or fluorescent brightening agents, optical compensation of the yellow cast (bleached paper or textile has a yellowish color,) may be obtained. The yellow cast is produced by the absorption of short-wavelength light (violet-to-blue). With optical brighteners this short-wavelength light is in part replaced, thus a complete white is attained without loss of light. This additional light is produced by the brightener by means of fluorescence. Optical brightening agents absorb the invisible portion of the daylight spectrum and convert this energy into the longer-wavelength visible portion of the spectrum, i.e., into blue to blue-violet light. Optical brightening, therefore, is based on the addition of light. Two requirements are indispensable for an optical brightener: it should be optically colorless on the substrate, and it should not absorb in the visible part of the spectrum. Paper OBA's are almost exclusively stilbene based, that is based on one or two stilbene residues. Most are derivatives of 4,4'-diaminostilbene-2,2'disulphonic acid and in particular the bistriazinyl derivatives (4,4'Bis(triazine-2-ylamino)stilbene-2,2'disulphonic acid). In their use in paper they are in an anionic form or, at least, partially anionic. Other examples of OBA's are disodium salt of distyrlbiphenyl disulfonic acid, 4,4'-di-triazinylamino-2,2'-di-sulfostilbene.

As can be seen from the OBA chemistry mentioned above, OBAs have a negative charge. Therefore, they are electrostatically attracted by cationic polymers. This interaction interferes with the fluorescence of the OBA, often in such a way that the fluorescence is quenched and the OBA loses its effect. For this reason papermakers are careful with not only the addition of cationic polymers that promote sizing to their papermaking system, but also the location of adding these cationic promoter resin relative to the OBA. Some cationic polymers are worse than others and size promoters have a strong fluorescence-quenching effect. Fine paper, and in particular printing & writing paper, generally contains OBA's.

Brightness is a commonly used industry term for the numerical value of the reflectance factor of a sample with respect to blue light of specific spectral and geometric characteristics. (TAPPI test method 452 om-92).

The brightness unit is a relative one. The measured brightness is expressed as the ratio between the reflectance factor of the sample (at effective 457 nm) and the reflectance factor of a perfect reflecting sample times 100%. The brightness can be larger than 100% when OBA's are used (they fluoresce in this wavelength area, that is, they emit light). Further information on the measurement of brightness can be found in "Pulp and Paper Chemistry and Chemical Technology, $3^{rd}$ edition, Vol. V, James P. Casey, ed.", John Wiley & Sons, New York (1981): 1828-1833.

For fine paper a TAPPI brightness loss of 0.5 units would be significant. A sizing composition that lowers brightness by more than this amount would be significant detriment, depending on the application. Furthermore a promoted sizing composition that exhibits a brightness loss of less than 0.5 would represent a significant advance in many applications. In Comparative Example 11 which listed in Example 17, paper which did not have a OBA in it had a brightness of 89.6. With OBA added the brightness is 95.5, listed as comparative example 12, Example 17.

Other monomeric components, however, may be present in addition to the formula (III) monomer, formula (IV) monomer and formula (V) monomer without adversely affecting the sizing promoter properties of the polymerization reaction product. The other monomeric components are limited to less than 50% of the total monomer mix and must not inhibit the water solubility. Crosslinking monomers such as triethylene glycol dimethacrylate (TEGDMA) can be utilized. If too much crosslinking monomer is used, a product which would be insoluble in water would be formed. Thus the amount of of crosslinking monomer is limited by the resultant final polymerization product water insolubility.

The amphoteric promoter polymers are water-soluble polymers possessing relatively high average molecular weights. The weight average molecular weight ($M_w$) for these polymers, (not including residual monomer) is at least about 10,000 and more preferably at least about 30,000. While not wishing to be bound by theory, it is expected that the polymer produced by free radical polymerization of these monomers will result in a random or alternating polymer. The polymerization reaction conditions are controlled to facilitate the random distribution of monomers. Experimental strategies to control polymerization conditions are shown in the examples.

The most preferred polymerization is a free-radial, chain polymerization that leads to less than 4% residual monomers and less than 5% of the product, (including monomers) with a number average molecular weight less than 500 g/mole.

The monomeric components utilized for preparation of the polymerization reaction products are either known and are available commercially (e.g., DADMAC from CPS Chemical Company, Inc. (Old Bridge, N.J.) and from Pearl River Polymers (Pearl River, La.); DADMAC and DAA.HCl from Sigma Chemical Company (St. Louis, Mo.)) or may be prepared by conventional processes, typically used for the preparation of diallyl-type compounds. Acrylic acid is available from many commercial sources, including Rohm & Haas, Philadelphia, Pa.

The preparation of the polymeric reaction product is preferably carried out by a chain polymerization of the monomers of formulas (I) and (II). Alternatively the monomers of formulas (III), (IV) and (V) can be polymerized by a chain polymerization in the presence of a free radical polymerization initiator.

The polymerization reaction of the diallyi-type monomer components and organic acid is carried out in a suitable solvent, polar solvents being preferred. Water is a particularly preferred solvent for the polymerization reaction. Other polar solvents which do not adversely affect the polymerization reaction may also be used. One factor to be considered in the selection of a suitable solvent is the potential for reaction between the initiator employed and the solvent, causing the polymerization reaction to be quenched.

Suitable solvents also include water mixed with a water-miscible solvent or solvents and do not adversely affect the polymerization reaction.

The amount of water or organic solvent used in the polymerization reaction medium is desirably minimized, to provide high concentrations of the monomers in the reaction medium. The lower limit for the amount of reaction medium is generally dictated by the need to obtain adequate mixing of the reaction medium throughout the polymerization reaction and the need to provide adequate heat transfer to avoid having the polymerization exotherm and overheat the run. Since the viscosity of the reaction medium normally increases as high molecular weight polymers are formed from the monomer components, it may be advantageous to add additional solvent during the course of the polymerization reaction to adjust the viscosity of the reaction medium.

Preferably, the concentration of monomeric reactants in the polymerization solvent is from about 5 to about 60 wt. %, and more preferably, from about 10 to about 50 wt. %, based on the weight of the reaction medium.

Before the start of the polymerization, it is advantageous to adjust the pH of the reaction medium to bring the pH to a value of about 1.5 to about 6. An acid, preferably an inorganic acid such as a hydrohalo acid like HCl, is typically used for this adjustment of the pH.

The polymerization reaction temperature employed is normally based on the performance characteristics of the initiator used and is also dictated by the rate of polymerization and degree of polymerization (molecular weight) desired. The polymerization is typically carried out at a temperature of about 40° C. to about 100° C., preferably about 50° C. to about 95° C. and more preferably at a temperature of about 60° C. to about 90° C., at ambient pressure (one atmosphere). The polymerization reaction is ordinarily characterized by being very exothermic in its early stages. The polymerization may require many hours, to ensure relatively complete reaction of the monomer components.

The polymerization reaction of the monomer components is started in the customary manner, typically by addition of a suitable initiator, preferably one that is water-soluble.

Preferably, ammonium persulfate, t-butyl hydroperoxide, 2,2'-azobis-(2-amidinopropane) dihydrochloride, 2,2'-azobis-(2-imidazol-2-yl-propane) dihydrochloride, 2,2'-azobis-(2-carbamoylpropane) dihydrate or 2,2'-azobis-(2-methoxycarbonylpropane) is used as the initiator.

Other suitable initiators, i.e., substances which form free radicals, include hydrogen peroxide, benzoyl peroxide, cumene hydroperoxide, methyl ethyl ketone peroxide, lauryl peroxide, t-butyl perbenzoate, di-t-butyl perphthalate, azobisisobutyronitrile, 2,2'-azobis-(2,4-dimethylvaleronitrile), 2-phenyl-azo-2,4-dimethyl-4-methoxyvaleronitrile, 2-cyano-2-propylazoformamide, azodiisobutyramide, dimethyl, diethyl or di-n-butyl azobismethylvalerate, t-butyl perneodecanoate, di-isononanoyl peroxide, t-amyl perpivalate, di-2-ethyl-hexyl peroxydicarbonate, dilauroyl peroxide, di-isotridecyl peroxydicarbonate, t-butyl peroxyisopropyl percarbonate. Combinations or mixtures of initiators may also be used.

About 0.01 to about 10% by weight, preferably about 0.1 to about 5% by weight, of initiator is used, based on the amount (weight) of the monomer components. It is advantageous to carry out the polymerization with the exclusion of oxygen, to minimize the amount of initiator used and to maximize the polymer molecular weight. This can be effected in a conventional manner, for example, by flushing or degassing with an inert gas, such as nitrogen or argon. The initiator may be added at the outset of the reaction or, alternatively, may be added continuously or in aliquots during the course of the polymerization reaction, until the majority of the monomer components are consumed. Utilization of the monomer components, including their rate of consumption, during the polymerization may be monitored by carbon 13 NMR or liquid and ion chromatography.

Acrylic acid and similar unsaturated carboxylic acids as shown in formula (V) are more reactive in this polymerization reaction system than the formula (III) and formula (IV) components. Thus, the formula (V) component or components are added slowly to the reaction mixture to minimize formation of a homopolymer of the formula (V) components. Either formula (III) or formula (IV) components can be added to the formula (V) component and this mixture added to the reaction mixture The three monomers defined by formula (III), formula (IV), and formula (V) are employed in relative amounts such that the polymerization reaction product contains the desired molar ratio of formula (III) monomer component formula (IV) monomer component and formula (V) monomer component, within the preferred ranges as described earlier.

The molecular weight of the polymer product was determined by Size Exclusion Chromatography using a waters 717 Wisp instrument with a Waters 515 HPLC-Pump, Waters Temperature Control Module and a column heater module. The Mobile Phase was 50:50 aqueous 1% sodium nitrate, 0.1% trifluoroacetic acid: acetonitrile. The columns used were a: Eichrom CATSEC 4000 (10 um particle size)+1000 (7 um particle size)+300 (5 um particle size)+100A (5 um particle size) columns in series. Silica gel base material with bonded polyamine surface. The column Temperature was 35° C. and the injection volume: 100 ul. The detector was a differential refractive index detector: Hewlett Packard 1047A. The flow rate was 1.0 ml/min. The calibration standards: American Polymer Standards Poly(2-vinyl pyridine) 2,900-1,250,000 daltons, 1-propyl pyridinium bromide. The sample concentration: 5 mg/ml and internal standard was dimethylformamide, Total run time: 60 mins.

Residual monomers were measured by nuclear magnetic resonance spectrometry. Samples were dissolved in D2O for a lock solvent and acetonitrile used an internal reference set to 119 ppm. 13C NMR was run at 100 or 125 MHz. The relative weight percents were determined by integration of the peaks attributed to the residual monomers with respect to all integrated area of polymer and monomer.

The polymerization reaction product is a water-soluble polymer and consequently may be utilized as an aqueous solution. Such aqueous solutions of the polymerization reaction product may be employed as a paper sizing promoter in the manufacture of sized paper and may optionally contain the sizing agent in the aqueous medium.

The polymerization reaction products serve as highly effective paper sizing promoters in combination with conventional alkaline papermaking sizing agents. Sizing agents based on alkyl(straight chain or branched) or alkenyl ketene dimers or multimers and alkenyl succinic anhydride sizing agents are preferred. Combinations of these with other paper sizing agents may also be employed.

These and other hydrophobic sizing agents are well known in the art, and a wide variety of such sizing agents may be employed in combination with the paper sizing promoter of this invention. Paper sizing agents are usually employed as aqueous emulsions, aqueous dispersions or aqueous solutions. The term "emulsion" is used herein, as is customary in the art, to mean either a dispersion of the liquid-in-liquid type or of the solid-in-liquid type.

AKD emulsion stability is defined as an emulsion that can be made and when left at 22 degrees centigrade will not develop significant nonuniformity within 24 hours. Significant nonuniformity is that which would make it unusable on a paper machine for its intended purpose.

These paper size emulsions are often limited by their stability, that is, the emulsion will separate and the material is not useable as a separated emulsions. An added unexpected benefit of the amphoteric promoter resin of this invention is that when added to a sizing agent emulsion the resultant emulsion stability remained acceptable.

Ketene dimers used as paper sizing agents are well known. Alkyl ketene dimers, containing one β-lactone ring, are typically prepared by the dimerization of alkyl ketenes made from two fatty acid chlorides. Commercial alkyl ketene dimer sizing agents are often prepared from palmitic and/or stearic fatty acids, e.g., Hercon® sizing agents (Hercules Incorporated, Wilmington, Del.). Similar alkyl ketene dimer sizing agents may be prepared from branched alkyl ketene dimers. An example of a source of alkyl for a branched ketene dimer is the isostearic group from isostearic acid.

Alkenyl ketene dimer sizing agents are also commercially available, e.g., Aquapel® sizing agents (Hercules Incorporated, Wilmington, Del.) and Precis® sizing agents (Hercules Incorporated, Wilmington, Del.). Ketene multimers, containing more than one β-lactone ring, may also be employed as paper sizing agents, and these may be alkyl or alkenyl ketene dimers.

Ketene dimers used as paper sizing agents are generally dimers having the formula

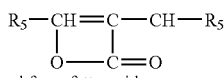

VI $R_5$ = alkyl group derived from fatty acids where $R_5$ is a hydrocarbon radical, such as alkyl having at least 8 carbon atoms, cycloalkyl having at least 6 carbon atoms, aryl, aralkyl and alkaryl. In naming ketene dimers, the radical "$R_5$" is named followed by "ketene dimer". Examples of ketene dimers include octyl, decyl, dodecyl, tetradecyl, hexadecyl, octadecyl, eicosyl, decosyl, tetracosyl, phenyl, benzyl, beta-naphthyl and cyclohexyl ketene dimers, as well as the ketene dimers prepared from montamic acid, naphthenic acid, Δ9,10-decylenic acid, Δ9,10-dodecylenic acid, palmitoleic acid, oleic acid, ricinoleic acid, linoleic acid, linolenic acid, and eleostearic acid, as well as ketene dimers prepared from naturally occurring mixtures of fatty acids, such as those mixtures in coconut oil, babassu oil, palm kernel oil, palm oil, olive oil, peanut oil, rapeseed oil, beef tallow, lard and whale blubber. Mixtures of any of the above-named fatty acids with each other may also be used.

Hydrophobic acid anhydrides are useful as sizing agents for paper such as:

(i) rosin anhydride (see U.S. Pat. No. 3,582,464, for example, the disclosure of which is incorporated herein by reference);

(ii) anhydrides having the structure

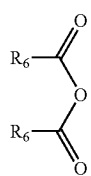

VII where $R_6$ is a saturated or unsaturated hydrocarbon radical, the hydrocarbon radical being a straight or branched chain alkyl radical, an aromatic substituted alkyl radical, or an alkyl substituted aromatic radical so long as the hydrocarbon radical contains a total of from about 14 to about 36 carbon atoms; and (iii) cyclic dicarboxylic acid anhydrides, having the structure

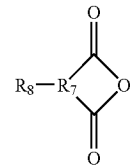

VIII where $R_7$ represents a dimethylene or trimethylene radical and where $R_8$ is a hydrocarbon radical containing more than 7 carbon atoms which are selected from the group consisting of alkyl, alkenyl, aralkyl or aralkenyl. Preferred substituted cyclic dicarboxylic acid anhydrides falling within the above formula (VIII) are substituted succinic and glutaric anhydrides. In formula (VII) above each $R_6$ can be the same hydrocarbon radical or each $R_6$ can be a different hydrocarbon radical.

Specific examples of anhydrides of formula (VII) are myristoyl anhydride; palmitoyl anhydride; oleoyl anhydride; and stearoyl anhydride.

Specific examples of anhydrides of formula (VII) are i- and n-octadecenyl succinic acid anhydride; i- and n-hexadecenyl succinic acid anhydride; i- and n-tetradecenyl succinic acid anhydride; dodecyl succinic acid anhydride; decenyl succinic acid anhydride; ectenyl succinic acid anhydride; and heptyl glutaric acid anhydride.

Hydrophobic organic isocyanates, e.g., alkylated isocyanates, are another class of compounds used as paper sizing agents that are well known in the art. Preferably the hydrocarbon chains of the isocyanates are alkyls that contain at least 12 carbon atoms, preferably from 14 to 18 carbon atoms. Such isocyanates include rosin isocyanate; dodecyl isocyanate; octadecyl isocyanate; tetradecyl isocyanante; hexadecyl isocyanate; eicosyl isocyanate; docosyl isocyanate; 6-ethyldecyl isocyanate; 6-phenyldecyl isocyanate; and polyisocyanates such as 1,18-octadecyl diisocyanate and 1,12-dodecyl diisocyanate, wherein one long chain alkyl group serves two isocyanate radicals and imparts hydrophobic properties to the molecule as a whole.

Other conventional paper sizing agents suitable for use in this invention include alkyl carbamoyl chlorides, alkylated melamines such as stearylated melamines.

The polymerization reaction product may be used as a paper sizing amphoteric promoter resin according to this invention via an internal addition method or via a surface application (external) method, or via a combination of these methods. Satisfactory performance of the polymerization reaction product as an amphoteric promoter resin is generally obtained regardless of the particular method of application employed.

In the internal addition method, the sizing promoter is introduced into the paper furnish during the papermaking process. The sizing promoter is introduced in combination with the paper sizing agent (or agents), either as separately introduced feed streams or as an aqueous medium containing both components. Addition of premixed sizing promoter and paper sizing agent (or agents) is preferred. Other conventional papermaking compounds or additions may also be employed with the sizing promoter and/or sizing agent. Following the general guidance of the art, the optical brighteners should not be added at the same time as a cationic-promoter resin. However, the amphoteric promoter resin may be added at the same time as the optical brightener, thus minimizing paper machine addition points. Addition of the amphoteric promoter resin at a location other than the optical brightener would also be advantageous. Considering the complexity of paper making process—pulp sources, other chemical additives—the optimum addition point for the amphoteric resin in a specific paper mill would need to be determined by trial and error. In Examples 11 to 19 the sizing agent, the amphoteric promoter resin, and the optical brightener was added simultaneously in the base sheet as part of a starch solution with a pH of 8.

In the surface application method, the sizing promoter is ordinarily applied as a size press treatment or as a coating, by conventional coating or spraying techniques, to the preformed paper, and then the paper or treatment or coating is dried. The paper is then treated with an appropriate paper sizing agent (or agents) and it is dried again. Alternatively, the paper sizing agent and sizing promoter may be applied in a surface treatment method in a single application, with an aqueous treatment/coating medium containing paper sizing agent, sizing promoter and, optionally, other conventional components. Following the general guidance of the art, the optical brighteners should not be added at the same time as a cationic promoter resin. However, the amphoteric promoter resin may be added with the optical brightener, thus minimizing paper machine addition points. Addition of the amphoteric promoter resin at a location other than the optical brightener would also be advantageous. Considering the complexity of paper making process—pulp sources, other chemical additives—the optimum addition point for the amphoteric resin in a specific paper mill would need to be determined by trial and error.

Preferred papers are those papers used in printing where contrast of the paper and the printing is important. Other preferred papers are also those where high brightness levels are the foal. Most preferred papers are those generally classified as "fine papers" used such uncoated papers made for electroreprographic or ink-jet printing. A very common application where the usefulness of the current invention would be obvious is in high brighness cut-sheet copy paper.

Other optional components, for use in an internal addition method and/or surface application method, may include a variety of additives conventionally used in papermaking, such as starch, fillers, pulp, retention aids, strengthening additives, drainage aids, colorants, optical brighteners, defoamers and the like.

Regardless of the method employed, the polymerization reaction product amphoteric promoter resin ("polymer") and the paper sizing agent ("size") should be utilized in a respective weight ratio of from about 0.05:1 to about 4:1 polymer:size; preferably, from about 0.1:1 to about 1:1 polymer:size and most preferably 0.10:1 to 0.5:1.

The paper sizing agent (or agents) is ordinarily used in an amount to provide good sizing property characteristics in the paper. Sized paper typically contains from about 0.005 to about 1.5 wt. %, preferably, from about 0.025 to about 0.5 wt. % and, more preferably, from about 0.05 to about 0.25 wt. % paper sizing agent, based on the weight of the dried sized paper.

When the polymerization reaction product is employed as an amphoteric promoter resin in combination with a conventional paper sizing agent, the amount of paper sizing agent in the sized paper may be decreased without sacrifice of the paper sizing property. The sizing promoter can also be used in combination with other, conventional sizing promoters or sizing additives.

Sufficient amphoteric promoter resin should be employed to yield sized paper containing the sizing promoter in an amount of from about 0.002 to about 0.6 wt. %, preferably, from 0.007 to about 0.3 wt. %, and, more preferably, from about 0.012 to about 0.15 wt. %, based on the weight of the dried sized paper.

One advantage of the sizing promoter is that the sized paper-need only be dried to a residual moisture level of from about 8 wt. % to about 12 wt. %, based on the weight of the paper, to provide satisfactory immediate sizing property characteristics. Without the sizing promoter, such sized paper typically needs to be dried to a residual moisture level of about 4-6 wt. % to achieve equivalent immediate sizing property characteristics. By "immediate" is meant the properties of the paper at the end of the paper making and finishing processes, without undo aging as is often necessary with unprompted AKD Sizing. When dried to such conventionally used moisture levels, sized paper employing the sizing promoter of this invention provide increased sizing property characteristics if under the conditions of the process the unpromoted sizing agent did not fully develop its sizing property characteristics.

A second advantage is that sized paper produced with the amphoteric promoter resin will exhibit increased whiteness or brightness when optical brighteners are used versus use of common cationic promoter resins known prior to this invention.

Several general procedures applicable to the polymerization reaction products and their use are described below.

Hercules Size Test (HST)

The sizing property performance in sized paper may be characterized by the Hercules Size Test, a well-recognized test for measuring sizing performance. The Hercules Size Test is described in *Pulp and Paper Chemistry and Chemical Technology*, J. P. Casey, Ed., Vol. 3, p. 1553-1554 (1981). The Hercules Size Test determines the degree of water sizing obtained in paper, by measuring the change in reflectance of the paper's surface as an aqueous solution of dye penetrates from the opposite surface side. The aqueous dye solution, e.g., naphthol green dye in 1% formic acid in the Examples described below, is contained in a ring on the top surface of the paper, and the change in reflectance is measured photo-electrically from the bottom surface.

Test duration is limited by choosing a convenient end point, e.g., a reduction in reflected light of 20%, corresponding to 80% reflectance, in the Examples described below. A timer measures the time (in seconds) for the end point of the test to be reached. Longer times correlate with increased sizing performance, i.e., resistance to water penetration increases. Unsized paper will typically fail at 0 seconds, lightly sized paper will register times of from about 1 to about 20 seconds, moderately sized paper from about 21 to about 150 seconds, and hard sized paper from about 151 to about 2000 seconds or more.

The brightness of pulp, paper, and paperboard is measured by directional reflectance at 457 nm. This method is described in the TAPPI method T 452 om92.

Polymerization Reaction Product General Procedure

A water-soluble polymer of diallyldimethyl-ammonium chloride (DADMAC), diallylammonium chloride (DM-.HCl) and acrylic acid may be prepared by the following general procedure.

An aqueous mixture of the three monomer components is made by adding the respective monomer components in water in the appropriate mole ratio sought in the polymerization reaction product. The aqueous reaction mixture is degassed with an inert gas, such as nitrogen or argon. Both the monomer mixture and an aqueous solution of a water-soluble free radical polymerization initiator, such as 2,2'-azobis(2-amidinopropane) dihydrochloride, are added slowly and continuously to a reaction vessel at 80° C., until the majority of the monomer components have been consumed in the polymerization reaction. Water is usually added to the reaction mixture during the polymerization reaction to prevent the viscosity in the aqueous reaction mixture from becoming excessive. The concentration of the monomer components in the aqueous reaction mixture should not be dilute, since high concentrations of the monomers provide better polymerization results.

Alternatively all of the DAA.HCl is added with some water to a vessel along with approximately 90% of the DADMAC and approximately 20% of the AA. solution of initiators prepared and a mixture of the remaining DADMAC and AA is prepared. All solutions are degassed. The reaction vessel is heated to 60° C. the initiator solution and monomer solution are slowly added over time (12 hour). The monomer solution is added at a decreasing rate and the temperature is slowly increased to 95° over 10 hours.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Examples 1-8, described below, are exemplary of this general procedure for obtaining the polymerization reaction products of this invention.

For all of the Examples described below, the sizing property of the paper was determined using the Hercules Size Test (as described above) immediately after the paper was made and also (in several of the Examples) after the paper was aged at 50% relative humidity and at a temperature of 22° C., for seven days or longer (as noted in the Examples).

All references in the Examples to "parts" refers to parts by weight, except were notes as lbs/ton or #/ton. The latter is a common designation in the paper industry.

The invention is illustrated further by the following specific, non-limiting Examples.

POLYMER SYNTHESIS EXAMPLE 1

A water-soluble copolymer of diallyldimethyl-ammonium chloride (DADMAC), diallylammonium chloride (DM.HCl) and acrylic acid (AA) was prepared as follows. The monomer mole ratio used in the polymerization reaction product was about 45:45:10 DADMAC:AA DM.HCl.

Three separate Parts were prepared and were are added to the glass reaction flask such that the final composition is achieved.

Part I: The DAA.HCl was prepared by adding 6.75 parts of DAA a reaction vessel. While agitating the DM 25.35 parts 10% HCl solution (2.54 parts HCl, 22.81 parts water) was added. The resultant pH was 3.5.

Part II: A mixture of DADMAC and AA were prepared in a separate mixing vessel. 106.1 parts water was added to the vessel 19.4 parts AA followed by 8.2 parts of a 65% aqueous solution of DADMAC. The solution was mixed. Final pH was ~2. This mixture was added over time to the reaction vessel which has DAA-HCl present.

Part III was made in the reaction vessel by adding to part I 74.07 parts 65% solution of DADMAC and 4.87 parts AA.

Part IV. To a second mixing vessel 30.71 parts water was added with 2.78 parts of V50 initiator. The mix was stirred to dissolve the V50 in the water.

Each of these three mixtures was purged with nitrogen to eliminate dissolved oxygen and an oxygen-free atmosphere was maintained in the reaction and mixing vessels during the polymerization.

The Part III reaction mixture was heated to 60° C. and 3.35 parts of Part IV added. Part II monomer mixture and the Part IV initiator solution were slowly and constantly added at constant prescribed addition rates to the reaction vessel. The addition profile is shown in following table:

| Time | Reaction Temp. | Monomer Addition over time | Initiator Addition |
|---|---|---|---|
| 0 to 60 minutes | 60 C. | Add 1/2 of Part 2 over 1 hour | Add 8.2% of solution of Part 4 over 1 hour |
| (The reaction is exothermic and the temperature will rise if cooling is not provided, the temperature rise is the most significant in the first hour, during the first 2 hours the temperature should be kept below 75 C.) | | | |
| 60 to 240 minutes | 70 | Add 1/4 of solution of Part 2 over 3 hours | Add 25% of solution of Part 3 over 3 hours |
| 240 to 600 minutes | 85 C. | Add 1/4 of solution of Part 2 over 6 hours | Add 50% of solution of Part 3 over 6 hours |
| 480 minutes | 85 | None | Add 15% of solution of Part 3 |
| 480 to 600 minutes | | | |
| 600 minutes | 85 | None | remainder of solution of Part 3 (14.4%). After 600 min. add remainder of initiator |
| 600 to 720 minutes | 95 | None | None | viscosity at 85 C. before dilution was measured at 1125 cps and the solids was measured as 31%
at end while still hot, add dilution water (149.7 parts water)
Cool to Room Temperature.

NOTE:
care should be taken with addition points of initiator and monomers into the reaction vessel such that they are immediately mixed into the reaction solution in a uniform manner The resulting aqueous solution of amphoteric promoter resin was 20% polymer by weight, 80% water. Residual monomers levels on a mole % of original monomers were determined by C-13 NMR and were found to be approximately: acrylic acid, less than 0.1%; DAA.HCl, less than 0.4% and DADMAC, less than 1%. Other properties include Brookfield viscosity at 22° C. of less than 300 cps, pH 2-4, color off-white, and specific gravity of 1.05 g/cc.

POLYMER SYNTHESIS EXAMPLE 2

The following solutions were made, stirred to uniformity, and deoxygenated for 30 minutes just before use with a nitrogen sparge. (Deionized water was used for preparation for all solutions.) The target composition was 40:40:20, DADMAC/AA/DAA*HCl.

Solution A: 26.8 g of a 50% DAA-HCl solution in water (made by mixing DAA and HCl (see ex. 1))+48.3 g 60% DADMAC solution +55.0 g water (deionized water was used in the experiments)

Solution B: 14.4 g AA+5.4 g 60% DADMAC solution+ 100.0 g water

Solution C: 1.8 g 2,2'-AZOBIS(2-AMIDINOPROPANE) DIHYDROCHLORIDE+50 ml water

Solution A was added to a closed reaction vessel equipped with an overhead stirrer and a nitrogen purge.

Solution B was added to an addition funnel set-up to drip into the reaction vessel.

The funnel was set to drop directly onto the liquid in the vessel and not on the sides of the flask.

Solution C was set-up to be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 75C, 1/6 of the initiator solution was added quickly. 2/3 of the initiator was added via pump starting when the temperature reached 75° C. and continuing at a steady rate for 6 hours. After 6 hours (when the temperature was increased to 95° C.) the last 1/6 of the initiator was added.

The monomers in the addition funnel were added at a steady rate starting when the temperature reached 75° C. and continuing for 7 hours.

The temperature of the reaction was kept at 75° C. for 4 hours then increased to 85° C. for 3 hours and then increased to 95° C. for 1 hour.

The reaction was allowed to slowly cool to room temperature after the hour at 95° C. The sample was diluted to approximately 20% solids with water. The flask was then opened and the polymer solution analyzed.

The polymer solution was 22.5% solids. By C-13 NMR analysis the solution contained a polymer with 43 parts (on a molar basis) acrylic acid units, 38 parts DADMAC units, and 7 parts DAA-HCl units. On the same basis it contained 1 part residual AA, 8 parts residual DADMAC and 3 parts residual DAA-HCl.

POLYMER SYNTHESIS EXAMPLE 3

The following solutions were made, stirred to uniformity, and deoxygenated for 30 minutes just before use with a nitrogen sparge. (Deionized water was used for preparation for all solutions.) The target composition was 45:45:10, DADMAC/AA/DAA*HCl.

Solution A: 9.9 g of a 68% DAA-HCl solution in water (see above)+60.4 g of a 60% DADMAC solution+30.0 g water (deionized water was used in the experiments)

Solution B: 16.29 M+50.0 g water

Solution C: 1.77 g 2,2'-AZOBIS(2-AMIDINOPROPANE) DIHYDROCHLORIDE+50 g water

Solution A was added to a closed reaction vessel equipped with an overhead stirrer and a nitrogen purge.

Solution B was added to an addition funnel set-up to drip into the reaction vessel.

The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 75° C., 1/10 of the initiator solution was added quickly. 2/3 of the initiator was added via pump starting when the temperature reached 75° C. and continuing at a steady rate for 7 hours. After 7 hours (when the temperature was increased to 95° C.) the remainder of the initiator was added.

The AA monomer in the addition funnel were added at a steady rate starting when the temperature reached 75° C. and continuing for 7 hours.

The temperature of the reaction was kept at 75° C. for 4 hours then increased to 85° C. for 3 hours and then increased to 95° C. for 1 hour.

The reaction was allowed to slowly cool to room temperature after the hour at 95° C. The sample was diluted to approximately 20% solids with water. The flask was then opened and the polymer solution analyzed.

The polymer solution was 24.7% solids. By C-13 NMR analysis the solution contained a polymer with 48 parts (on a molar basis) acrylic acid units, 45 parts DADMAC units, and 5 parts DAA-HCl units. On the same basis it contained less than 1 part residual AA, 1 part residual DADMAC and less than 1 part residual DAA-HCl.

POLYMER SYNTHESIS EXAMPLE 4

The following solutions were made, stirred to uniformity, and deoxygenated for 30 minutes just before use with a nitrogen sparge. (Deionized water was used for preparation for all solutions.) The target composition was 45:45:10, DADMAC/AA/DAA*HCl.

Solution A: 44.6 g of a 50% DAA-HCl solution in water (see above)+201.3 g 60% DADMAC solution+100 g water (deionized water was used in the experiments)

Solution B: 54.0 g AA+200.0 g water

Solution C: 5.9 g 2,2'-AZOBIS(2-AMIDINOPROPANE) DIHYDROCHLORIDE+50 ml water

Solution A was added to a closed reaction vessel equipped with an overhead stirrer and a nitrogen purge.

Solution B was added to an addition funnel set-up to drip into the reaction vessel. The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 70° C., 10% of the initiator solution was added quickly.

70% of the initiator was added via pump starting when the temperature reached 70° C. and continuing at a steady rate for 6 hours. After 7 hours (when the temperature was already at 95° C. for 1 hour) the last 20% of the initiator was added.

The AA monomer in the addition funnel were added at a steady rate starting when the temperature reached 70° C. and continuing for 7 hours.

The temperature of the reaction was kept at 75° C. for 4 hours then increased to 85° C. for 2 hours and then increased to 95° C. for 2 hours.

The reaction was allowed to slowly cool to room temperature after the 2 hours at 95° C. The sample was diluted to approximately 20% solids with water. The flask was then opened and the polymer solution analyzed.

The polymer solution was 23.0% solids. By C-13 NMR analysis the solution contained a polymer with 49 parts (on a molar basis) acrylic acid units, 47 parts DADMAC units, and 2 parts DAA-HCl units. On the same basis it contained less than 1 part residual AA, 1 part residual DADMAC and 0.4 parts residual DAA-HCl.

POLYMER SYNTHESIS EXAMPLE 5

The following solutions were made, stirred to uniformity, and deoxygenated for 30 minutes just before use with a nitrogen sparge. (Deionized water was used for preparation for all solutions.) The target composition was 45:45:10, DADMAC/AA/DAA*HCl.

Solution A: 9.9 g of a 68% DAA-HCl solution in water (see above)+60.49 of a 60% DADMAC solution+30.0 g water (deionized water was used in the experiments).

Solution B: 16.2 g M+44.0 g water

Solution C: 1.77 g 2,2'-AZOBIS(2-AMIDINOPROPANE) DIHYDROCHLORIDE+50 g water.

Solution A was added to a closed reaction vessel equipped with an overhead stirrer and a nitrogen purge.

Solution B was added to an addition funnel set-up to drip into the reaction vessel. The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 65° C.

Upon reaching 65° C., 1/10 of the initiator solution was added quickly.

2/3 of the initiator was added via pump starting when the temperature reached 65° C. and continuing at a steady rate for 8 hours. After 8.5 hours (when the temperature had been at 95° C. for 30 minutes) the remainder of the initiator was added.

The AA monomer in the addition funnel were added at a steady rate starting when the temperature reached 65° C. and continuing for 8 hours.

The temperature of the reaction was kept at 65° C. for 6 hours then increased to 85° C. for 2 hours and then increased to 85° C. for 2 hours.

The reaction was allowed to slowly cool to room temperature after the 2 hours at 95° C. The sample was diluted to approximately 20% solids with water. The flask was then opened and the polymer solution analyzed.

The polymer solution was 24.7% solids. By C-13 NMR analysis the solution contained a polymer with 47 parts (on a molar basis) acrylic acid units, 44 parts DADMAC units, and 5 parts DAA-HCl units. On the same basis it contained less than 1 part residual AA, 3 parts residual DADMAC and 0.6 part residual DAA-HCl.

POLYMER SYNTHESIS EXAMPLE 6

The following solutions were made, stirred to uniformity, and deoxygenated for 30 minutes just before use with a nitrogen sparge. (Deionized water was used for preparation for all solutions.) The target composition was 50:50, DADMAC/AA. No DAA:HCl was included in this example.

Solution A: 66.7 g of a 60% DADMAC solution+33.3 g water (deionized water was used in the experiments)

Solution B: 18.0 g AA+122.0 g water

Solution C: 1.74 g 2,2'-AZOBIS(2-AMIDINOPROPANE) DIHYDROCHLORIDE+50 g water

Solution A was added to a closed reaction vessel equipped with an overhead stirrer and a nitrogen purge.

Solution B was added to an addition funnel set-up to drip into the reaction vessel. The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 75° C., 15% of the initiator solution was added quickly.

½ of the initiator was added via pump starting when the temperature reached 75° C. and continuing at a steady rate for 6 hours. After 6 hours (when the temperature was increased to 95° C.) 17% of the initiator was added quickly and after 7 hours the remainder was added quickly.

The AA monomer in the addition funnel were added at a steady rate starting when the temperature reached 75° C. and continuing for 7 hours.

The temperature of the reaction was kept at 75° C. for 4 hours then increased to 85° C. for 2 hours and then increased to 95° C. for 2 hours.

The reaction was allowed to slowly cool to room temperature after the hour at 95° C. The sample was diluted to approximately 25% solids with water. The flask was then opened and the polymer solution analyzed.

The polymer solution was 25.5% solids. By C-13 NMR analysis the solution contained a polymer with 51 parts (on a molar basis) acrylic acid units and 44 parts DADMAC units. On the same basis it contained less than 1 part residual AA and 4 parts residual DADMAC.

POLYMER SYNTHESIS EXAMPLE 7

The following solutions were made, stirred to uniformity, and deoxygenated for 30 minutes just before use with a nitrogen sparge. (Deionized water was used for preparation for all solutions.) The target composition was 40:40:20, DADMAC/AA/DAA*HCl.

Solution A: 26.8 g of a 50% DAA-HCl solution in water (see above)+48.3 g of a 60% DADMAC solution+55.0 g water (deionized water was used in the experiments)

Solution B: 14.4 g M+5.4 g of a 60% DADMAC solution+100.0 g water

Solution C: 1.8 g 2,2'-AZOBIS(2-AMIDINOPROPANE) DIHYDROCHLORIDE+50 ml water

Solution A was added to a closed reaction vessel equipped with an overhead stirrer and a nitrogen purge.

Solution B was added to an addition funnel set-up to drip into the reaction vessel. The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 75° C., ⅙ of the initiator solution was added quickly.

½ of the initiator was added via pump starting when the temperature reached 75° C. and continuing at a steady rate for 6 hours. After 6 hours (when the temperature was increased to 95° C.) ⅙ of the initiator was added quickly and after 7 hours the remainder was added quickly.

The AA and DADMAC monomers in the addition funnel were added at a steady rate starting when the temperature reached 75° C. and continuing for 7 hours.

The temperature of the reaction was kept at 75° C. for 4 hours then increased to 85° C. for 2 hours and then increased to 95° C. for 2 hours.

The reaction was allowed to slowly cool to room temperature after the hour at 95° C. The sample was diluted to approximately 20% solids with water. The flask was then opened and the polymer solution analyzed.

The polymer solution was 22.5% solids. By C-13 NMR analysis the solution contained a polymer with 43 parts (on a molar basis) acrylic acid units, 38 parts DADMAC units, and 7 parts DAA-HCl units. On the same basis it contained less than 1 part residual AA, 8 parts residual DADMAC and 3 parts residual DAA-HCl.

POLYMER SYNTHESIS EXAMPLE 8

The following solutions were made, stirred to uniformity, and deoxygenated for 30 minutes just before use with a nitrogen sparge. (Deionized water was used for preparation for all solutions.) The target composition was 33:33:35, DADMAC/AA/DAA*HCl.

Solution A: 53.6 g of a 50% DAA-HCl solution in water (see above)+53.7 g of a 60% DADMAC solution+50.0 g water (deionized water was used in the experiments)

Solution B: 14.4 g AA+100.0 g water

Solution C: 2.2 g 2,2'-AZOBIS(2-AMIDINOPROPANE) DIHYDROCHLORIDE+50 ml water

Solution A was added to a closed reaction vessel equipped with an overhead stirrer and a nitrogen purge. Solution B was added to an addition funnel set-up to drip into the reaction vessel.

The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 75° C., 1/10 of the initiator solution was added quickly.

⅔ of the initiator was added via pump starting when the temperature reached 75° C. and continuing at a steady rate for 6 hours. After 7 hours (when the temperature was at 95° C. for 1 hour) the last of the initiator was added quickly The AA monomer in the addition funnel was added at a steady rate starting when the temperature reached 75° C. and continuing for 7 hours.

The temperature of the reaction was kept at 75° C. for 4 hours then increased to 85° C. for 2 hours and then increased to 95° C. for 2 hours.

The reaction was allowed to slowly cool to room temperature after the hour at 95° C. The sample was diluted to approximately 20% solids with water. The flask was then opened and the polymer solution analyzed.

The polymer-solution was 22.2% solids. By C-13 NMR analysis the solution contained a polymer with 35 parts (on a molar basis) acrylic acid units, 32 parts DADMAC units, and 24 parts DAA-HCl units. On the same basis it contained less than 1 part residual AA, 4 parts residual DADMAC and 5 parts residual DAA-HCl.

Paper Making General Procedures

Preparation of the paper in Examples 9 through 19 described below, utilized the following general procedures.

The amphoteric promoter resins are used to promote sizing agents. The sizing agents were prepared according to descriptions below or were obtained from commericially available sources:

Hercon® 195 reactive size is a highly efficient, alkyl ketene dimer (AKD) emulsion specifically designed to enhance drainage and optimize sizing efficiency in most papermaking systems. While Hercules Hercon 195 reactive size is a cationically stabilized emulsion and self-retaining, the addition of either cationic starch or cationic resins is recommended for maximum size retention and performanc. (Hercules Incorporated, Wilmington, Del.)

HERCON® 79 cellulose-reactive sizing emulsion is designed to function at alkaline pH in the presence of low alkalinity. Hercon 79 is slightly cationic and has an affinity for the fiber. Additional promoter resin or cationic starch may be required for retention.

Hercon 79 sizing develops rapidly on the paper machine to control pickup of size press or calender solutions. Full sizing typically is attained off the rewinder. Hercon 79 has minimal interference with wet-end optical whitening agents compared with more cationic grades of Hercon. (Hercules Incorporated, Wilmington, Del.)

HERCON® 70 reactive size is a highly efficient, reactive sizing emulsion for use against a wide variety of penetrants. It is not dependent on alum and reacts directly with cellulose to provide sizing. Operation at near-neutral pH provides an opportunity for the utilization of calcium carbonate as an inexpensive, high-brightness filler and for the production of stronger, permanent, highly sized paper. (Hercules Incorporated, Wilmington, Del.)

AQUAPELO 364 is an alkylketene dimer derived from long-chain fatty acids. It reacts chemically, under mild conditions, with many substances having active hydrogen atoms in their structural makeup. Resulting products can have new and desirable properties. For example, Aquapel 364 is especially outstanding for imparting water repellency to various forms of cellulosic materials.

Chemical Structure

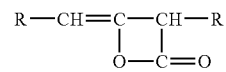

R=alkyl group derived from fatty acids (Hercules Incorporated, Wilmington, Del.)

RETEN® 201 cationic resin and retention aid is an efficient cationic source designed to coagulate fines and other anionic contaminants typically present in bleached and unbleached papers. —It is a low molecular weight, high charge density polyamine/epichlorohydrin polymer (Hercules Incorporated, Wilmington, Del.)

HERCON® 70 Sizing Emulsion

Hercon® 70 paper sizing agent (Hercules Incorporated, Wilmington, Del.), an aqueous alkyl ketene dimer (AKD) sizing dispersion. The (AKD) sizing agent was evaluated at a concentration of 0.09 wt %, and the Hercon® 70 sizing agent was evaluated at two different concentrations, 0.06 wt % and 0.07 wt %. All sizing agent concentrations noted in this Example and in subsequent Examples are based on the dry weight of the paper furnish.

Polyethyleneimine can be purchased from a commercial source such as Sigma-Aldrich, Milwaukee, Wis. The sample had a reported molecular weight of 10000.

Poly(acrylamide) can be purchased from a commercial source such as Sigma-Aldrich, Milwaukee, Wis.

The following examples demonstrate the applications of amphoteric promoter resins. There are two types of examples given: those from work on a pilot paper machine and those from laboratory work using a size press treatment. Comparative examples with cationic promoter resins or with no promoter resins were prepared in a similar fashion.

The performance of the polymerization reaction products prepared in Example 1-8 was evaluated in sized paper at several different use levels, with different commercial sizing agents. Commercially available sizing promoters were also included in the evaluation to provide a performance benchmark for the polymerization reaction product sizing promoter of this invention. These are reported as comparative examples. Several experiments were completed that had no sizing promoter present. These are reported as comparative examples.

The commercial sizing agents utilized were Precis® 2000 paper sizing agent (Hercules Incorporated, Wilmington, Del.), an aqueous starch-stabilized reactive alkaline sizing dispersion.

Three commercial, state-of-the-art sizing enhancers were utilized for comparison purposes:

The work performed on the pilot paper machine was much like the most anticipated use of the invention in the real world. On the pilot machine the AKD, amphoteric promoter resin, and OBA were incorporated into a pulp mix on its way to being formed into paper. As with a real paper machine the paper was formed, pressed, and dried before being wound on a reel. The rate of sizing development was determined by measuring the amount of HST developed in the paper as it was dried and at the end of the paper machine. The samples for HST were cut out of the paper web after dryer cans as it progressed along the paper machine dryer section. The amount of sizing determined immediately without any additional treatment. It is critical to measure the sizing in a uniform time frame from sample to sample because sizing will continue to increase in the paper sample that was cut out of the paper web. The sizing level was also measured after several weeks of aging (natural aged sizing) where sizing had reached a steady state. The aged result provided a guide to show that the same amount of AKD was in each of the samples (that is equal retention of AKD). For the experiments presented in this disclosure the retention of AKD in the samples remained essentially constant so that differences in HST observed during the drying and at the end of the paper machine were related to differences in the rate of sizing development.

For the laboratory size press work the AKD, amphoteric promoter resin, and OBA were added to a starch solution that was then applied to a paper base sheet that had been specially made ahead of time. Comparative examples with cationic promoter resins or with no promoter resins were prepared in a similar fashion. The base sheet, as made, contained no starch or sizing agent. The additives were applied by passing the paper down through a two roll mill which held a puddle of the chemical solution above the rollers. After the AKD, promoter resin, OBA, and starch were applied to the paper base sheet, the base sheet was dried on a drum drier. The laboratory work with a size press provided a model closer to what would happen if the additives were applied at a size press. Nevertheless, it was shown to provide a good relative measure of the effectiveness of the new promoter resins of the current invention versus more traditional promoter resins. In addition the laboratory size press work is not very far from modeling the wet-end performance of the additives in terms of how sizing develops in the first dryer section of a paper machine. Paper going into a dryer section of a fine paper machine is approximately 50% water. The base sheet paper after treatment in the laboratory size press picked up its weight in water and thus was also at about a 50% level of water before drying.

In each of the Paper Making Examples the amphoteric promoter resins are listed based on the monomer ratio that was added to the polymerization. These amphoteric promoter resins were synthesized by procedures described in Synthetic Examples 1-8 or similar polymerization procedures.

PAPER MAKING EXAMPLE 9

Pilot Machine Comparison of Hercon® 70 and Hercon® 79 Sizing Agent Made with Amphoteric Promoter Resins This example shows two amphoteric promoter resins performance relative to a commercial sizing and promoted sizing agents.

The pilot paper machine was set up to run with an 80/20 by weight mix of hardwood and soft wood pulp. To the pulp slurry was added various chemicals. The amounts of the chemicals added are listed below. The percentages listed are based on the assumption that they were completely retained in the paper. The assumption is a good approximation for the paper machine used in the study. The values listed are predicted weight percentages in the final paper, again assuming perfect retention. If an example states that 0.5% starch was added it means that the final paper consisted of approximately 99.5% dried pulp and other additives and 0.5% starch. For the current example, the addition of chemicals was as follows: 0.5% low molecular weight cationic starch, 14% ground calcium carbonate, 0.1% of a microparticle retention/drainage aid combined with a 0.015% of an acrylamide based retention aid. 0.05% optical brightening agent was added and 0.075% AKD was added. The AKD was added as an emulsion. The type and level of promoter resin is listed below along with the results obtained. The promoter resins were used in the preparation of the AKD emulsion and were added as part of the emulsion.

In all papermaking cases the water used had 50 ppm alkalinity to better simulate real-world conditions. Other alkalinity is noted for each example that is not 50 ppm.

| Sample | Amphoteric Promoter Resin (APR) | Level of APR | HST (sec) After 7th Dryer Can | HST (sec) After 11th Dryer Can | Brightness |
|---|---|---|---|---|---|
| 9-1 | A | 0.019% | 95 | 256 | 90.9 |
| 9-2 | B | 0.019% | 105 | 264 | 90.7 |

-continued

| Sample | Amphoteric Promoter Resin (APR) | Level of APR | HST (sec) After 7th Dryer Can | HST (sec) After 11th Dryer Can | Brightness |
|---|---|---|---|---|---|
| Comparative Example 1* | None | None | 80 | 231 | 91.2 |
| Comparative Example 2** | C | 0.019% | 104 | 285 | 90.3 |

*Hercon 70 Sizing Agent
**Hercon 79 Sizing Agent
Amphoteric Promoter Resins
A: poly(DADMAC/AA/DAA*HCl) 40:40:20 molar basis
B: poly(DADMAC/AA/DAA*HCl) 45:45:10 molar basis
Cationic Promoter Resin
C: poly(DADMAC)

Compared to Comparative Example 1 which contained no promoter resin, Comparative Example 2, contained a pure cationic promoter resin, had a better rate of sizing development (104 vs 80 and 285 to 231 seconds of HST at two different dryer cans on the paper machine). However, Comparative Example 2 shows that the addition of a typical cationic promoter resin, poly(DADMAC), dropped the paper brightness from 91.2 to 90.3. The experimental promoter resins of the current invention both improved rate sizing development as measured by HST at the two different dryer cans. The ampnoteric promoter resins had less impact on brightness compared to the pure cationic resin.

PAPER MAKING EXAMPLE 10

Pilot Paper Machine Comparison of Hercon 195 Sizing Agent with Amphoteric Promoter Resin Samples Versus a Hercon 79 Sizing Agent The pilot paper machine was set up to run with an 80/20 by weight mix of hardwood and soft wood pulp. To the pulp slurry was added various chemicals. The amounts of the chemicals added are listed below. The percentages listed are based on the assumption that they were completely retained in the paper. The assumption is a good approximation for the paper machine used in the study. The values listed are predicted weight percentages in the final paper, again assuming perfect retention. If an example states that 0.5% starch was added it means that the final paper consisted of approximately 99.5% dried pulp and other additives and 0.5% starch. For the current example, the addition of chemicals was as follows: 0.5% low molecular weight cationic starch, 14% ground calcium carbonate, 0.1% of a microparticle retention/drainage aid combined with a 0.015% of an acrylamide based retention aid. 0.05% optical brightening agent was added and 0.075% AKD was added. The AKD was added as an emulsion. The type and level of promoter resin is listed below along with the results obtained.

For Example 10-1 the promoter resin was premixed with the AKD emulsion and was therefore added as part of the emulsion. Comparative Example 3 had no promoter resin added. Comparative Example 4 was made with a sizing agent product which contains AKD and p(DADMAC) as a cationic promoter resin. The ratio of AKD to cationic resin was 4:1.

| Sample | Promoter Resin | Level of Promoter Resin | HST (sec) After 7th Dryer Can | HST (sec) At reel After 11th Dryer Can & Calendar | Brightness |
|---|---|---|---|---|---|
| 10-1 | B | 0.0075% | 203 | 404 | 91.2 |
| Comparative Example 3 | None | None | 189 | 324 | 91.4 |
| Comparative Example 4 | C | 0.019% | 218 | 334 | 90.0 |

Amphoteric Promoter Resins
B: poly(DADMAC/AA/DAA*HCl) 45:45:10 molar basis
Cationic Promoter Resin
C: poly(DADMAC)

Compared to Comparative Example 3 with no promoter resin, example 10-1 with the amphoteric promoter resin had a better rate of sizing development (203 vs 189 and 404 to 324 seconds of HST at two different places on the paper machine). Example 7-2 shows that the addition of the amphoteric promoter resin dropped the paper brightness only slightly from 91.4 to 91.2. By comparison Comparative example 4 which was made with a typical AKD emulsion containing a cationic non-amphoteric promoter resin showed a large negative impact on the brightness, 91.4 to 90.0.

EXAMPLES 11 to 19

Amphoteric Promoter Resin: Testing on Laboratory Size Paper Press

For Examples 11 to 19 the following general paper preparation, treatment and testing were done.

A base sheet was prepared ahead of time on a pilot paper machine at Western Michigan University using an 75:25 mixture of hardwood and softwood bleached pulp. The base sheet was similar to copy paper made in the United States. It had a basis weight of 75 grams per square meter and contained 15% precipitate calcium carbonate. For the current use it was made without addition of starch or sizing agent.

The base sheet was treated in a laboratory size press. The base sheet was passed through a puddle in a size press and between its two rollers. Each treated sample was immediately dried on a drum drier which was at 65° C. The time in the drier was varied to simulate different times and levels of drying along a paper machine. The relative sizing generated for different drying times was measured immediately for each sample. The size press solution used to treat the paper consisted of approximately a 0.5% cationic starch solution. The pick-up of the solution into the paper was approximately 100%. Therefore, the level of starch added to the paper on a dry basis was 0.5 grams of starch for every 100 grams of paper, or a treatment of 0.5% on a dry basis. The exact pick-up of the base sheet was determined ahead of time for each set of experiments and the solids level of the starch adjusted to yield the desired treatment level. The additives being tested were added to the starch solution in a level based on the pick-up of the base sheet and by doing so the desired level of treatment was obtained.

Samples for HST testing were cut out at drying times (measured in seconds) and then tested via HST. The time between sampling and testing was routinely done at about the same time interval to assure that a good comparison can be made. The optical brightness was measured on the final paper.

PAPER MAKING EXAMPLE 11

Comparison of Amphoteric Promoter Resin at Two Different Addition Rates

For the following results a level of 0.075% OBA was added to the paper. The levels of amphoteric promoter resins added are noted below. The sizing obtained at different drying times is reported. The approximate moisture content at the two drying times was 34 and 30%. The AKD was added in the form of emulsion. The promoter resins were mixed with the AKD emulsion in the size press starch solution. The level of AKD added to the paper in every case was 0.09%

| | Level of Amphoteric promoter resin | Amphoteric Promoter Resin: poly(DADMAC/AA/DAA*HCl) 45:45:10 molar basis | | | | | |
|---|---|---|---|---|---|---|---|
| 11-1 | 0.009% | Dryer time, seconds | 23 | 25 | 27 | 30 | 33 | 36 |
| | | HST, Sec | 7 | 18 | 60 | 101 | 109 | 223 |
| 11-2 | 0.01% | Dryer time, seconds | 21 | 23 | 25 | 30 | 32 | |
| | | HST, Sec | 6 | 16 | 39 | 129 | 156 | |
| Comparative Example 5 | AKD Emulsion | Dryer time, seconds | 22 | 24 | 26 | 28 | 31 | 34 |
| | | HST, Sec | 7 | 7 | 10 | 13 | 48 | 42 |

Amphoteric Promoter Resins
B: poly(DADMAC/AA/DAA*HCl) 45:45:10 molar basis

The addition of promoter resin improved the rate of sizing development with little impact on brightness. The data from example 11 is shown in Drawing 3 which shows the 45:45:10 amphoteric resin performs better than the Hercon 195 promoter system.

PAPER MAKING EXAMPLE 12

Comparison of Amphoteric Promoter Resin at Four Different Addition Rates

For the following results a level of 0.075% OBA was added to the paper. The levels of amphoteric promoter resins added are noted below. The sizing obtained at different drying times is reported. The approximate moisture content at the drying times was 29%±5%. The AKD was added as an emulsion. The amphoteric promoter resins were added with the AKD emulsion in the size press starch solution. The level of AKD added to the paper in every case was 0.09%. With no promoter resin or OBA the paper brightness was 90.1.

Various ratios Amphoteric Promoter Resin AKD @ 0.18%; Amphoteric promoter resin, DADMAC:AA:DAA:45:45:10 concentration in Table, OBA, 0.15%

| Products | #/Ton | Time (sec) | OM HST (sec) | NA HST (sec) | Brightness |
|---|---|---|---|---|---|
| 12-1 | -76-1 0.009% APR | 32 | 7 | | |
| | | 36 | 12 | | |
| | | 40 | 30 | 548 | |
| | | 48 | 67 | 530 | |
| | | 56 | 204 | 575 | 94.9 |
| 12-2 | -76-1 0.015% APR | 30 | 58 | | |
| | | 31 | 61 | | |
| | | 36 | 18 | | |
| | | 39 | 45 | 570 | |
| | | 45 | 133 | 509 | |
| | | 55 | 176 | 661 | 94.6 |
| 12-3 | -76-1 0.020% APR | 29 | 6 | | |
| | | 33 | 13 | | |
| | | 37 | 19 | 657 | |
| | | 41 | 94 | 594 | |
| | | 51 | 268 | 666 | 94.8 |
| 12-4 | -76-1 0.024% APR | 30 | 36 | | |
| | | 33 | 20 | | |
| | | 38 | 109 | 601 | |
| | | 44 | 159 | 562 | |
| | | 51 | 244 | 626 | 94.9 |
| Comparative Example 6 | Hercon 70/OBA | 1.8/1.5 | 28 | 2 | |
| | | 32 | 3 | | |
| | | 37 | 6 | | |
| | | 41 | 3 | 541 | |
| | | 48 | 16 | 504 | |
| | | 66 | 28 | 1400 | 95.3 |

The addition of amphoteric promoter resin improved the rate of sizing development with only a slight impact on brightness. The highest level of amphoteric promoter resin tested gave the greatest increase in the rate of sizing development. The non-promoted paper, comparative Example 6 while has good optical brightness, has very little measured sizing—16 seconds at 48 seconds drying time. The data in Example 12 is shown in Drawing 4.

PAPER MAKING EXAMPLE 13

Comparison of Different Polymer Compositions with No OBA in the Formulation

The following results are for samples with no OBA added to the paper. The levels of promoter resins added are noted below. The sizing obtained at different drying times is reported. Approximate moisture content at the drying times 35%±5. The AKD was added in the form of Hercules' Hercon 70 sizing agent emulsion. The promoter resins were added with the AKD emulsion in the size press starch solution. The level of AKD added to the paper in every case was 0.09%.

Amphoteric Promoter Resin DADMAC:AA:DAA Amphoteric Promoter Resin, 0.015%; AKD. 0.09%, No OBA added Mole ratio

| | | | | | | | | |
|---|---|---|---|---|---|---|---|---|
| 13-1 | 50:50:00 | Dryer time, seconds | 19 | 20 | 23 | 27 | 29 | |
| | | HST, Sec | 12 | 14 | 41 | 100 | 247 | |
| 13-2 | 45:45:10 | Dryer time, seconds | 20 | 21 | 23 | 25 | 27 | 32 |
| | | HST, Sec | 85 | 65 | 81 | 111 | 230 | 336 |
| 13-3 | 40:40:20 | Dryer time, seconds | 19 | 21 | 23 | 25 | 28 | |
| | | HST, Sec | 12 | 79 | 127 | 113 | 238 | |

-continued

| | | Amphoteric Promoter Resin DADMAC:AA:DAA Amphoteric Promoter Resin, 0.015%; AKD. 0.09%, No OBA added Mole ratio | | | | | | |
|---|---|---|---|---|---|---|---|---|
| 13-4 | 33:33:35 | Dryer time, seconds HST, Sec | 19 40 | 21 49 | 23 63 | 25 44 | 29 140 | 32 232 |

Promoter Resins
A: poly(DADMAC/AA/DAA*HCl) 40:40:20 molar basis
B: poly(DADMAC/AA/DAA*HCl) 45:45:10 molar basis
D: poly(DADMAC/AA/DAA*HCl) 50:50:0 molar basis
E: poly(DADMAC/AA/DAA*HCl) 33:33:33 molar basis Addition of DAA-HCl as one of the monomers improved the rate of sizing development. In this test system the best level of DAA-HCl was around 10 to 20 percent when no OBA was present. The data in Example 13 is shown in Drawing 5.

PAPER MAKING EXAMPLE 14

Comparison of Different Polymer Compositions with OBA in the Formulation

The following results are for samples with 0.075% OBA added to the paper. The levels of amphoteric promoter resins added are noted below. The sizing obtained at different drying times is reported. The approximate moisture content at the three drying times was 25+/−5%. The AKD was added in the form of an emulsion. The amphoteric promoter resins were added with the AKD emulsion in the size press starch solution. The level of AKD added to the paper in every case was 0.09%. The emulsion was made by the following technique Preparation of Emulsions For Example 14

Alkyl ketene dimer 11 parts
Low molecular weight cationic starch 1.29 parts
sodium lignin sulfonate 0.24 parts
alum 0.10 parts
biocide 0.05 parts
water 73.16 parts
promoter resin 13.92 parts of a 20% solids solution The starch and sodium lignin- sulfonate and water were cooked at 95-100° C. for one hour at neutral pH.

The starch solution was used within a few hours. It was stored and used at 75° C.

The alkyl ketene dimer was added to the starch (where it melted, and mixed).

The mixture was fed through a microfluidizer (impinging streams) system set at 3000 psi which transformed the mixture into an emulsion.

The emulsion was cooled to 48-55° C. and then cooled to 26° C.

After 4 hours at 26° C. alum was added as a 5% solution mixed in and then the promoter resin added.

The final solids was adjusted to 15.5%.

| Sample | Products | Time (sec) | OM HST (sec) | NA HST (sec) | Optical Brightness |
|---|---|---|---|---|---|
| 14-1 | H 70/50:50:0 DADMAC:AA: DAA/OBA | 26 | 3 | | |
| | | 29 | 6 | | |
| | | 33 | 12 | 563 | |
| | | 37 | 6 | 598 | |
| | | 43 | 17 | 700 | |
| | | 52 | 203 | | 95.1 |
| 14-2 | H 70/45:45:10 DADMAC:AA: DAA/OBA | 26 | 6 | | |
| | | 29 | 1 | | |
| | | 32 | 2 | 547 | |
| | | 36 | 2 | 532 | |
| | | 43 | 4 | 635 | |
| | | 49 | 8 | | 94.9 |
| 14-3 | H 70/40:40:20 DADMAC:AA: DAA | 26 | 1 | | |
| | | 29 | 1 | | |
| | | 33 | 2 | 470 | |
| | | 39 | 3 | 545 | |
| | | 43 | 3 | 535 | |
| | | 49 | 10 | | 95.1 |
| 14-4 | H 70/33:33:33 DADMAC:AA: DAA/OBA | 27 | 5 | | |
| | | 30 | 3 | | |
| | | 32 | 10 | 527 | |
| | | 35 | 7 | 534 | |
| | | 39 | 22 | 612 | |
| | | 44 | 90 | | 95.3 |
| comp. Example 7 | AKD Sizing | 28 | 1 | | |
| | | 30 | 1 | | |
| | | 32 | 1 | 153 | |
| | | 38 | 1 | 109 | |
| | | 43 | 3 | 338 | |
| | | 55 | 9 | 479 | 94.2 |

All of the amphoteric promoter resins enhanced the rate of sizing more than Comparative Example 7 even though less amphoteric promoter resin was added than with the promoter resin was added in Comparative Example 7. Addition of DAA-HCl as one of the monomers under the conditions of the current experiment did not improve the rate of sizing development except at the highest level of addition where 33 mole % DAA.HCl was used in the polymer. The data in Example 14 are shown in Drawing 6.

PAPER MAKING EXAMPLE 15

Comparison of Different Polymer Compositions

The following results are for samples with 0.075% OBA added to the paper. The levels of promoter resins added are noted below. The sizing obtained at different drying times is reported. The approximate moisture content at the drying times was 25=/−5%. The AKD was added in the form of Hercules' Hercon 70 sizing agent emulsion. The promoter resins were added with the AKD emulsion in the size press starch solution. The level of AKD added to the paper in every case was 0.09%.

| Sample | Amphoteric Promoter resin DADMAC:AA:DAA | | Drying times and HST measurements | | | | | | Optical Brightness |
|---|---|---|---|---|---|---|---|---|---|
| 15-1 | 50:50:00 | Dryer time, seconds | 33 | 40 | 45 | 53 | 70 | 105 | 94.5 |
| | | HST, Sec | 1 | 1 | 2 | 3 | 59 | 505 | |
| 15-2 | 45:45:10 | Dryer time, seconds | 33 | 41 | 46 | 53 | 65 | 87 | 94.8 |
| | | HST, Sec | 2 | 4 | 7 | 28 | 25 | 401 | |
| 15-3 | 40:40:20 | Dryer time, seconds | 34 | 41 | 50 | 60 | 71 | 100 | 95 |
| | | HST, Sec | 2 | 2 | 5 | 4 | 21 | 458 | |
| 15-4 | | Dryer time, seconds | 35 | 47 | 54 | 65 | 79 | 106 | 94.7 |
| | 33:33:33 | HST, Sec | 1 | 5 | 13 | 35 | 296 | 381 | |
| Comp Ex. 8 | H79 | Dryer time, seconds | 35 | 47 | 56 | 69 | 85 | 110 | 93.2 |
| | | HST, Sec | 0 | 0 | 1 | 2 | 11 | 12 | |

H79 = Hercon 79 Reactive Sizing Emulsion

For each of the different ratios of monomer compents the sizing of the paper was developed more quickly and the optical brightness was not adversely effected relative to the control, a Hercon 79 reactive sizing Emulsions. The data for Example 15 are shown in Drawing 7.

PAPER MAKING EXAMPLE 16

Amphoteric Promoter Resins as Components in an AKD Emulsion

In this example the amphoteric promoter resins were added to Hercon 79 formulations and tested. The resultant AKD emulsion with the promoter resins were stable. (Examples 16-1 and 16-2). The amphoteric promoter resin with DADMAC and AA without any DAA performed about the same as the Hercon 79 formulation. This modest performance of the amphoteric promoter resin is attributed to the high level of OBA and the high amphoteric promoter resin to AKD ratio. The optical brightness of both 16-1 and 16-2 is much better than the comparative example 9.

| Sample | Products | #/Ton Resin/ OBA | Time (sec) | OM HST (sec) | NA HST (sec) | Brigtness |
|---|---|---|---|---|---|---|
| 16-1 | H79 (DADMAC-AA-DAA)/OBA 40:40:20 | 1.8/1.5 | 24 | 6 | | 95.1 |
| | | | 26 | 14 | | |
| | | | 28 | 75 | | |
| | | | 33 | 104 | 587 | |
| | | | 37 | 134 | 557 | |
| | | | 46 | 61 | 608 | |
| 16-2 | H79 (DADMAC-AA)/OBA 50:50:00 | 1.8/1.5 | 24 | 1 | | 94.4 |
| | | | 27 | 2 | | |
| | | | 31 | 3 | 593 | |
| | | | 39 | 23 | 559 | |
| | | | 46 | 42 | 630 | |
| Comp ex. 9 | H79 (control)/ OBA | 1.8/1.5 | 25 | 22 | | 93.6 |
| | | | 28 | 14 | | |
| | | | 32 | 32 | | |
| | | | 36 | 24 | 615 | |
| | | | 41 | 17 | 534 | |
| | | | 54 | 41 | 553 | |

For each of the different ratios of monomer components the sizing of the paper was developed more quickly and the optical brightness was not adversely effected relative to the control, a Hercon 79 reactive sizing Emulsions. The data for example 16 are shown in Drawing 8.

PAPER MAKING EXAMPLE 17

Amphoteric Promoter RESINS as Components in an AKD Emulsion

The amphoteric promoter resin in this example was made by a synthetic technique similar to Synthetic Example # 1, with the ratio of DADMAC:AA:DAA::45:45:10. The paper was prepared in a manner identical to the previous examples except that the precipitated calcium carbonate was 18% not 15%.

| | | | | | | | | Optical Brightness |
|---|---|---|---|---|---|---|---|---|
| H70 + -79 (600gal) | Dryer time, seconds | 32 | 39 | 47 | 57 | 63 | 71 | |
| | HST, Sec | 3 | 6 | 6 | 36 | 546 | 730 | 93.7 |
| Comp. Ex. 10 | Dryer time, seconds | 40 | 46 | 54 | 64 | 75 | 89 | |
| H70 + R203 | HST, Sec | 5 | 4 | 7 | 42 | 75 | 505 | 92 |

Hercon 70 Reactive size (abbreviated here as H70 was promoted with the 45:45:10 amphoteric promoter resin. Comparative example 10 had no amphoteric promoter resin, but did have Retene 203 cationic resin and retention aid (obtained from Hercules Incorporated, Wilmington Del.). The data for this Example 17 is shown in Drawing 12.

POLYMER SYNTHETIC EXAMPLE 18

Preparation of Amphoteric Promoter Resin based on alkenyl sulfonate Groups as the anionic component.

Example of 50/50 DADAMC/AMPS

The following solutions were made, stirred to uniformity, and deoxygenated for 30 minutes just before use with a nitrogen sparge. (Deionized water was used for preparation for all solutions.) The target composition was 50/50 DAD- MAC/AMPS on a molar basis. AMPS stands for 2-acrylamide-2-methyl-1-propane sulfonic acid. Deionized water was used in the experiment.

Solution A: 80.0 g water+0.5 g V-50.

Solution B: 40.25 g 65% DADMAC solution+84.4 g water+57.25 g AMPS (the pH was adjusted to 3.7 with a 1% HCl solution)

Solution C: 1.5 g V-50+50 ml water

Solution D: 1.0 g V-50+10.0 g water

Solution A was added to a closed reaction vessel equipped with an overhead stirrer and a nitrogen purge.

Solution B was added to an addition funnel set-up to drip into the reaction vessel.

The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 75° C. the addition of Solutions B and C were started and were added completely over a uniform rate for 10 hours.

After 10 hours the temperature was increased to 90° C. for 2 hours. After 10 hours solution D was also added. After 2 hours at the higher temperature the reaction was allowed to slowly cool to room temperature. The sample was diluted to approximately 20% solids with water. The flask was then opened and the polymer solution analyzed.

The polymer solution was 18.3% solids. By C-13 NMR analysis the solution contained a polymer with 48 parts (on a molar basis) AMPS units and 35 parts DADMAC units. On the same basis it contained 18 parts residual DADMAC.

POLYMER SYNTHETIC EXAMPLE 19

Preparation of Amphoteric Promoter Resin Based on Alkenyl Sulfonate Groups as the Anionic Component Polymer Synthesis Example of 66/33 DADAMC/AMPS The following solutions were made, stirred to uniformity, and deoxygenated for 30 minutes just before use with a nitrogen sparge. (Deionized water was used for preparation for all solutions.) The target composition was 50/50 DADMAC/AMPS on a molar basis. AMPS stands for 2-acrylamide-2-methyl-1-propane sulfonic acid. Deionized water was used in the experiment.

Solution A: 80.09 water+0.59 V-50.

Solution B: 60.4 g 65% DADMAC solution+126.7 g water+42.9 g AMPS (the pH was adjusted to 3.8 with a 1% HCl solution)

Solution C: 1.5 g V-50+50 ml water

Solution D: 1.0 g V-50+10.0 g water

Solution A was added to a closed reaction vessel equipped with an overhead stirrer and a nitrogen purge.

Solution B was added to an addition funnel set-up to drip into the reaction vessel. The funnel was set to drop directly onto the liquid in the vessel and not on the sides of the flask.

Solution C was set-up the be pumped slowly into the reaction vessel.

During the polymerization steady, uniform stirring at about 60 rpm was maintained for the reaction vessel. The nitrogen purge was maintained throughout the reaction. A condenser was attached to one outlet at the top of the reaction vessel. The nitrogen purge existed the reaction through the top of the condenser through a liquid trap.

The reaction vessel was heated to 75° C.

Upon reaching 75° C. the addition of Solutions B and C were started and were added completely over a uniform rate for 10 hours.

After 10 hours the temperature was increased to 90° C. for 4 hours. After 10 hours solution D was also added. After 4 hours at the higher temperature the reaction was allowed to slowly cool to room temperature. The sample was diluted to approximately 20% solids with water. The flask was then opened and the polymer solution analyzed.

The polymer solution was 18.1% solids. By C-13 NMR analysis the solution contained a polymer with 27 parts (on a molar basis) AMPS units and 42 parts DADMAC units. On the same basis it contained 31 parts residual DADMAC.

PAPER MAKING EXAMPLE 20

Comparison of Polymer Compositions Derived From Alkenyl Sulfonate Groups

Monomers that contain an alkenyl sulfonate as the anionic monomer component of the polymer also promotes sizing. The following results are for samples with 0.075% OBA added to the paper and compare cationic promoter resins with amphoteric promoter resins with alkenyl sulfonates. The synthesis of the alkenyl sulfonate containing APR's is given in polymer synthesis Examples 18 and 19. The levels of promoter resins added are noted below. The AKD was added in the form of Hercules' AKD sizing agent emulsion. The promoter resins were added with the AKD emulsion in the size press starch solution. The level of AKD added to the paper in every case was 0.09%.

| Sample | Promoter Resin | Level of Promoter Resin | optical brightness |
|---|---|---|---|
| 20-1 | F | 0.030% | 95.1 |
| 20-2 | G | 0.030% | 95.2 |
| Comparative Example 11 | none | none | (no OBA) 89.6 |
| Comparative Example 12 | none | none | 95.5 |
| Comparative Example 13 | C | 0.030% | 93.2 |
| Comparative Example 14 | I | 0.030% | 93.8 |

Cationic Promoter Resins
C: poly(DADMAC)
H: poly(DADMAC/Acrylamide) 50:50 delete if no companion sizing data is available.)
I: poly(DADMAC/Vinylpyrrolidone) 50:50
Amphoteric promoter resin
D: poly(DADMAC/AA/DAA*HCl) 50:50:0 molar basis
F: poly(DADMAC/2-acrylamide-2-methyl-1-propane sulfonic acid) 50:50
G: poly(DADMAC/2-acrylamide-2-methyl-1-propane sulfonic acid) 66:33

The addition of a sulfonate comonomer with DADMAC led to a decrease in interference with OBA resin. Addition of nonanionic monomers, acrylamide or vinylpyrrolidone) led only to a decrease in OBA interference that would be expected from the dilution of the DADMAC level in the polymer. Comparative examples 11 and 12 show for this set of experiments the effect of the addition of an OBA on paper brightness, 89.6 versus 95.5.

The data of Example 20 is shown in Drawing 9.

PAPER MAKING EXAMPLE 21

Comparison of Polymer Compositions Containing Sulfonate Groups; No OBA Added to the Paper The addition of the sulfonate monomer seemed to reduce the effectiveness of the other monomer (DADMAC) as a promoter of the rate of sizing during early drying; whereas, the addition of AA did not. The following samples contained no optical brightening agent. Furthermore, when a higher level of polymer containing 2-acrylamide-2-methyl-1-propane sulfonic acid was added, the improvement of rate of sizing became less. When an OBA was added polymers containing 2-acrylamide-2-methyl-1-propane sulfonic acid monomer did not provide an improvement in the rate of sizing. The amphoteric promoter resin was added at 0.015%.

| Sample | Promoter Resin | | | | | | | |
|---|---|---|---|---|---|---|---|---|
| 21-1 | D | Dryer time, seconds | 22 | 24 | 26 | 30 | 33 | 37 |
| | | HST, Sec | 14 | 29 | 79 | 135 | 247 | 234 |
| 21-2 | F | Dryer time, seconds | 24 | 26 | 29 | 32 | 35 | |
| | | HST, Sec | 12 | 81 | 194 | 103 | 236 | |
| 21-3 | G | Dryer time, seconds | 23 | 26 | 28 | 32 | 37 | |
| | | HST, Sec | 11 | 42 | 43 | 95 | 290 | |
| Comparative Example 14 | Hercon 70 Reactive Size | Dryer time, seconds | 23 | 25 | 27 | 29 | 39 | |
| | | HST, Sec | 8 | 30 | 42 | 38 | 252 | |

Amphoteric promoter resin
D: poly(DADMAC/AA/DAA*HCl) 50:50:0 molar basis
F: poly(DADMAC/2-acrylamide-2-methyl-1-propane sulfonic acid) 50:50
G: poly(DADMAC/2-acrylamide-2-methyl-1-propane sulfonic acid) 66:33

The alkenyl sulfonate amphoteric promoter resin improved sizing. The data for Example 21 is shown in Drawing 9.

PAPER MAKING EXAMPLE 22

Comparison of Polymer Compositions Containing Sulfonate Groups; No OBA Added to the Paper The addition of the sulfonate monomer seemed to reduce the effectiveness of the other monomer (DADMAC) as a promoter of the rate of sizing during early drying; whereas, the addition of AA did not. The following samples contained no optical brightening agent. Furthermore, when a higher level of polymer containing 2-acrylamide-2-methyl-1-propane sulfonic acid was added, the improvement of rate of sizing became less. When an OBA was added polymers containing 2-acrylamide-2-methyl-1-propane sulfonic acid monomer did not provide an improvement in the rate of sizing. The amphoteric promoter resin was added at 0.030%.

| 22-1 | D | Dryer time, seconds | 22 | 24 | 26 | 29 | 34 | 37 |
|---|---|---|---|---|---|---|---|---|
| | | HST, Sec | 17 | 35 | 116 | 174 | 173 | 432 |
| 22-2 | F | Dryer time, seconds | 24 | 26 | 29 | 32 | 36 | |
| | | HST, Sec | 5 | 33 | 31 | 59 | 138 | |
| 22-3 | G | Dryer time, seconds | 25 | 28 | 31 | 33 | 38 | |
| | | HST, Sec | 8 | 41 | 30 | 73 | 216 | |

Amphoteric promoter resin
D: poly(DADMAC/AA/DAA*HCl) 50:50:0 molar basis
F: poly(DADMAC/2-acrylamide-2-methyl-1-propane sulfonic acid) 50:50
G: poly(DADMAC/2-acrylamide-2-methyl-1-propane sulfonic acid) 66:33

The alkenyl sulfonate amphoteric promoter resin improved sizing. The data for Example 22 is shown in Drawing 10.

PAPER MAKING EXAMPLE 23

Amphoteric Promoter Resins with other Monomeric Components.

Amphoteric promoter resins were prepared with other monomers in the monomer mixture. The synthesis technique was nearly identical to Synthetic Examples 1-8 with the other monomer being added to one of the monomer streams added to the polymer reaction mixtures. Examples of other monomers are listed in the following table. Mole ratios are indicated in the fomulation in the following table.

| | | | | | | | |
|---|---|---|---|---|---|---|---|
| H70 + 50:50::DADMAC:AA | Dryer time, seconds | 19 | 20 | 23 | 25 | 27 | 29 |
| | HST, Sec | 12 | 14 | 41 | 118 | 100 | 247 |
| H70 + 48:48:4::DADMAC:AA:Styrene | Dryer time, seconds | 19 | 20 | 22 | 24 | 27 | 30 |
| | HST, Sec | 12 | 16 | 42 | 55 | 86 | 157 |
| H70 + 45:45:10::DADMAC:AA:DAA-HCl | Dryer time, seconds | 20 | 21 | 23 | 25 | 27 | 32 |
| DADMAC:AA:DAA-HCl | HST, Sec | 85 | 65 | 81 | 111 | 230 | 336 |
| H70 + 37.5:37.5:25:1::DADMAC:AA:DAA:TEGDMA | Dryer time, seconds | 19 | 20 | 24 | 27 | 30 | |
| DADMAC:AA:DAA:TEGDMA | HST, Sec | 22 | 72 | 137 | 137 | 232 | |

Where TEGDMA is triethylene glycol dimethacrylate

Amphoteric Promoter Resins can be prepared with other monomer units such as styrene and TEGDMA. The data for Example 23 is shown in Drawing 11

COMPARATIVE SYNTHESIS EXAMPLE 1

A water-soluble copolymer of diallyldimethyl-ammonium chloride (DADMAC) and diallylammonium chloride (DAA.HCl) was prepared in this Example as follows. The monomer mole ratio used in the polymerization reaction product was about 8:2 DADMAC:DAA.HCl.

An aqueous mixture was made by combining 53.8 parts of 65 wt % diallyldimethylammonium chloride in water with 14.5 parts of 49.8 wt % diallylammonium chloride in water.

The aqueous reaction mixture of the two monomer components was degassed with nitrogen for 40 minutes and warmed to a temperature of 55° C. with stirring.

A water-soluble free radical polymerization initiator, 4.23 parts of 9.09 wt % 2,2'-azobis(2-amidinopropane) hydrochloride in degassed water was added to the aqueous solution at a rate of 0.4 g/minute. After the addition of the initiator was complete, 16.9 parts of degassed water was added to reduce the viscosity of the reaction medium, and the mixture was maintained at a temperature of about 90° C.

The following step was carried out three times: 4.23 parts of 9.09 wt % 2,2'-azobis(2-amidinopropane) hydrochloride in degassed water was added rapidly, and the reaction mixture was then stirred for one hour.

At the end of the third one hour stirring period, analysis of the aqueous reaction mixture by carbon 13 NMR indicated that greater than 95% of the monomer components had been polymerized. The molecular weight data for the polymerization reaction product was determined by aqueous size exclusion chromatography (SEC) using a Synchrom DAT-SEC column set (4000+1000+300+100 columns in series), with 0.4 M lithium acetate and 2.0% ethylene glycol (pH 4.5) as the mobile phase, at a flow rate of 0.25 mL/minute. These SEC measurements determined that the polymerization reaction product had a number average molecular weight (Mn) of about 21,700 and a weight average molecular weight (Mw) of about 364,000.

COMPARATIVE SYNTHESIS EXAMPLE 2

A homopolymer of diallyldimethylammonium chloride (100:0 mole ration of DADMAC:DAA.HCl) was prepared in this Comparative Synthesis Example 11.

269.5 parts of 60 wt % diallyldimethylammonium chloride in water were degassed with nitrogen for about 30 minutes. The degassed solution was warmed to 70° C. while stirring. After warming, 2.56 parts of 2,2'-azobis(2-amidinopropane) hydrochloride in 23 parts of distilled, degassed water were added at a constant rate over about 25.7 hours. 123.0, 120.6 and 59.2 parts of distilled, degassed water were added after about 1.5, 1.7 and 4.3, hours, respectively, after beginning the addition of the initiator. About one hour after the initiator addition was complete, the mixture was blanketed with air and allowed to cool to ambient temperature. SEC measurements determined that the product had a weight average molecular weight (Mw) of about 385,000 with a polydispersity of 12.9. Carbon 13 NMR analysis indicated that 95% (mole basis) of the monomer had polymerized.

COMPARATIVE PAPERMAKING EXAMPLE 1

Loss of Paper Brightness Versus Cationic Promoter Resins

Typical cationic promoter resins were used to make paper and the optical brightness measured. These typical materials were poly(DADMAC), high molecular weight, poly(DADMAC) medium molecular weight, poly(dimethylamine/epichloridrin), polyethyleneimine and a neutral resin, poly(acrylamide). The poly(DADMAC)s, polyethyleneimine and poly(acrylamide) were purchased from Sigma Aldrich Chemical, Milwaukee, Wis. The poly(dimethylamine/epichloridrin) was obtained as RETEN® 201 cationic resin and retention aid. The cationic nature of the cationic promoter resin and the amount of cationic promoter resin added will reduce the effectiveness of optical brighteners. To demonstrate this on a comparable basis, the cationic density of each of these was determined by titration of the cationic component. The charge density of cationic resin products was measured at pH 8.0. A colloid titration is used. Charge density is the amount of cationic charge per unit weight in milliequivalents per gram of product solids.

The sample is titrated with potassium poly(vinyl sulfate), KPVS, to form a colloid. Once all of the charge has been titrated, the excess KPVS reacts with the end point indicator, toluidine blue, which changes from blue to purple. A dip probe colorimeter set at 620 nm and an automatic titrator (analog or digital) are used to perform the titration. The charge density is calculated from the titration results, on a dry solids basis. The charge density is reported in milliequivalents/gram. The total charge due to the cationic promoter resin is the charge density times the amount of cationic promoter resin in lbs/ton. For each of these promoter resins paper was prepared and the optical brightness measured. The unpromoted paper had a brightness of 96.5. Thus, the measured optical brightness is listed for two levels of cationic promoter resin. As the total charge increases the loss in brightness increases. Cationic promoter resins have a deleterious effect on paper optical brightness. The paper making process for this set of results were: No AKD; 1.5 lbs/ton of OBA; 80 lbs/ton of a low viscosity anionic starch, the water used had 100 ppm hardness, but no added alkalinity.

This information is shown in Drawing 1

| Typical commercial cationic promoter resins | Measure Charge Density | Addition Rate | Total Charge | Loss of Brightness (1.5#/T OBA) |
|---|---|---|---|---|
| High Molecular Wt. poly(DADMAC) | 6.1 | 0.25 | 1.53 | 0.85 |
| | | 0.5 | 3.05 | 1.65 |
| Medium Mol. Wt. poly(DADMAC) | 6 | 0.25 | 1.5 | 0.95 |
| | | 0.5 | 3 | 1.5 |
| Poly(Dimethylamine/ epichlorohydrin) | 6.1 | 0.25 | 1.53 | 0.6 |
| | | 0.5 | 3.05 | 1.15 |
| Polyethyleneimine | 11.2 | 0.25 | 2.8 | 1.1 |
| | | 0.5 | 5.6 | 2.5 |
| poly(acrylamide) (Neutral resin) | 0 | 0.25 | 0 | 0 |
| | | 0.5 | 0 | 0 |

COMPARATIVE PAPER MAKING EXAMPLE 2

Reduction in Brightness when Poly(DADMAC) and Poly(DADMAC/DAA-HCL) Cationic Promoter Resins are Used. The poly(DADMAC) and poly(DADMAC/DAA-HCL) were synthesized by comparative Polymer Synthesis Examples 1 and 2 respectively. The OBA was added at 1 lb/ton. These cationic promoter resins were used to make paper and the optical brightness measured. As more cationic promoter resin is added the deleterious effect on paper brightness increases. This data is shown in Drawing 2.

| Brightness vs #/T cationic promoter | | | | |
|---|---|---|---|---|
| | #/TCationic promoter | | | |
| | 0.38 | 0.75 | 1.12 | 1.12 |
| Poly(DADMAC) | 91.7 | 91.2 | 90.7 | |
| Poly(DADMAC/DAA-HCl) | | | | 90.6 |

Brightness of the paper without any cationic additive was 92.2

What is claimed is:

1. A method of producing sized paper in a paper making machine in which a paper pulp is entered into the wet end of the machine which comprises adding to the pulp, 1) an optical brightener, 2) sizing agent and 3) a water soluble amphoteric promoter resin that is (a) a polymerization reaction product of a monomer comprising at least one polymerizable cationic amine monomer of formula (I)

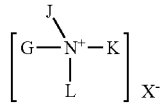

where G is a selected from alkyl, alkenyl, allyl, aryl; heteroatom interrupted alkyl or alkenyl, wherein the heteroatoms are selected from the group N, S, and O; and J, K, and L are selected from hydrogen, alkyl akenyl, allyl, styrenyl, and aryl; heteroatom interrupted alkyl or alkenyl, wherein the heteroatoms are selected from the group N, S, and O; and X is a sizing compatible anion; and (b) at least one polymerizable organic acid of formula (II)

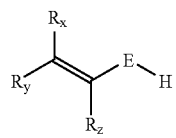

where $R_x$, $R_y$, and $R_z$, are hydrogen, alkyl, alkenyl, aryl heteroatom interrupted alkyl or alkenyl, wherein the heteroatoms are selected from the group N, S, and O; and E is an organic substituent selected from the group COO, SO3, HSO4, and H2PO4; and wherein the mole percent of the cationic amine units of formula I constitutes at least 25% of monomers in the amphoteric promoter resin and the mole percent of the organic acid of formula II constitutes at least 25% of monomers in the amphoteric promoter resin, wherein the additives 1), 2), and 3), become distributed throughout the interior of the resulting paper.

2. The method of claim 1 wherein the E in the monomer of formula II is COO.

3. A method of producing sized paper in a paper making machine in which a paper pulp is entered into the wet end of the machine which comprises adding to the pulp 1) a sizing agent, 2) an optical brightener and 3) a water soluble amphoteric promoter resin that is (a) a polymerization reaction product of monomer comprising at least one cationic quatemary diallyl ammonium monomer of formula (III).

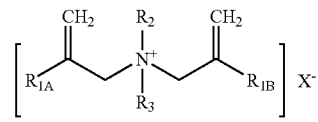

optionally, including at least 1 cationic diallylammonium monomer of formula (IV)

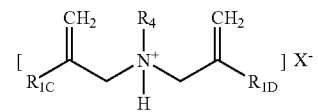

where $R_{1A}$, $R_{1B}$, $R_{1C}$ and $R_{1D}$ are hydrogen or $C_1$-$C_{22}$ straight chain or branched alkyl; $R_2$ and $R_3$ are alkyl, alkenyl, aryl, heteroatom interrupted alkyl or alkenyl, wherein the heteroatoms are selected from the group N, S, and O; $R_4$ is hydrogen, alkyl, alkenyl, aryl, heteroatom interrupted alkyl or alkenyl, wherein the heteroatoms are selected from the group N, S, and O; and X— is a sizing compatible anion and (b) at least one organic acid of formula (II)

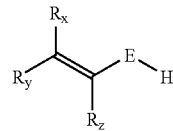

where $R_x$, $R_y$, and $R_z$, are hydrogen, alkyl, alkenyl, aryl, heteroatome interrupted alkyl or alkenyl, wherein the heteroatoms are selected from the group N S and O and E is an organic substituent selected from the group N, S, and O and E is an organic substituent selected from the group COO, SO3, HSO4, and H2PO4; and wherein the sum of the mole percent of the cationic quatemary diallyl ammonium monomers of formula (III) and the mole percent of the diallyl ammonium monomers of formula (IV) constitutes at least 25% of monomers in the amphoteric promoter resin and the mole percent of the unsaturated organic acid of formula (II) constitutes at least 25% of monomers in the amphoteric promoter resin wherein the additives 1), 2), and 3), become distributed throughout the interior of the resulting paper.

* * * * *